(12) United States Patent
Diboine et al.

(10) Patent No.: US 11,639,108 B2
(45) Date of Patent: May 2, 2023

(54) DISPLAY APPARATUS AND STORAGE FOR VEHICLE

(71) Applicant: LG Electronics Inc., Seoul (KR)

(72) Inventors: Romain Diboine, Seoul (KR); Seunghwan Song, Seoul (KR); Seung Mo Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 16/933,373

(22) Filed: Jul. 20, 2020

(65) Prior Publication Data
US 2021/0206270 A1 Jul. 8, 2021

(30) Foreign Application Priority Data

Jan. 8, 2020 (KR) .................. 10-2020-0002711

(51) Int. Cl.
*B60K 37/02* (2006.01)
*B60R 11/00* (2006.01)
(Continued)

(52) U.S. Cl.
CPC .............. *B60K 37/02* (2013.01); *B60K 35/00* (2013.01); *B60K 2370/152* (2019.05);
(Continued)

(58) Field of Classification Search
CPC ............... B60K 37/02; B60K 2370/67; B60K 2370/816; B60K 2370/1533; B60K 35/00;
(Continued)

(56) References Cited

U.S. PATENT DOCUMENTS

| 2015/0002991 A1* | 1/2015 | Vander Sluis | B60K 35/00 361/679.01 |
|---|---|---|---|
| 2021/0012751 A1* | 1/2021 | An | G09G 3/035 |
| 2021/0103314 A1* | 4/2021 | Ko | G06F 1/1624 |

FOREIGN PATENT DOCUMENTS

| DE | 102016224500 | 4/2018 |
|---|---|---|
| EP | 3064987 | 9/2016 |

(Continued)

OTHER PUBLICATIONS

KR Office Action in Korean Appln. 10-2020-0002711, dated Jun. 14, 2021, 17 pages (with English translation).

(Continued)

*Primary Examiner* — Douglas M Wilson
(74) *Attorney, Agent, or Firm* — Fish & Richardson P.C.

(57) ABSTRACT

A vehicle display device is configured to be mounted at a housing within a vehicle and to open and close an opening defined at the housing. The vehicle display device includes a first frame configured to be disposed at the opening, a second frame disposed at the first frame and configured to move relative to the first frame, a roller rotatably disposed at the second frame, a third frame disposed at a back surface of the second frame and configured to move relative to the second frame, and a display disposed at a front surface of the first frame and wound around the roller to connect to the third frame. The vehicle display device is configured to open and close at least a portion of the opening, where a size of the opened portion corresponds to a movement distance of the second frame with respect to the first frame.

20 Claims, 21 Drawing Sheets

(51) Int. Cl.
    *B60K 35/00*    (2006.01)
    *B60R 7/06*     (2006.01)
    *G09F 11/00*    (2006.01)

(52) U.S. Cl.
    CPC .. *B60K 2370/1533* (2019.05); *B60K 2370/67* (2019.05); *B60K 2370/816* (2019.05); *B60R 7/06* (2013.01); *B60R 2011/0084* (2013.01); *B60R 2011/0092* (2013.01); *B60Y 2400/3012* (2013.01); *G09F 2011/0081* (2013.01); *G09G 2380/10* (2013.01)

(58) Field of Classification Search
    CPC . B60K 2370/152; B60R 7/04; B60R 11/0235; B60R 2011/0084; B60R 2011/0092; B60R 11/0229; B60R 7/06; B60R 11/00; B60R 2011/0005; B60R 2011/0007; B60R 2011/008; B60R 2011/0049; F16H 19/04; F16H 25/20; B60Y 2400/3012; G09G 2380/10
    See application file for complete search history.

(56) References Cited

FOREIGN PATENT DOCUMENTS

| | | |
|---|---|---|
| EP | 3244451 | 11/2017 |
| GB | 2503337 | 12/2013 |
| JP | H0527330 | 2/1993 |
| JP | 2005349977 | 12/2005 |
| JP | 2006090850 | 4/2006 |
| JP | 2015152816 | 8/2015 |
| KR | 1020170027162 | 3/2017 |
| KR | 10-1806892 | 1/2018 |
| KR | 10-1821053 | 3/2018 |
| WO | WO2019200885 | 10/2019 |

OTHER PUBLICATIONS

EP Extended European Search Report in European Appln. No. 20183383.7, dated Dec. 8, 2020, 5 pages.

* cited by examiner

DISPLAY APPARATUS AND STORAGE FOR VEHICLE

CROSS-REFERENCE TO RELATED APPLICATION

This present application claims the benefit of priority to Korean Patent Application No. 10-2020-0002711, entitled "DISPLAY APPARATUS AND STORAGE FOR VEHICLE" filed on Jan. 8, 2020, the entire disclosure of which is incorporated herein by reference.

TECHNICAL FIELD

The present disclosure relates to a vehicle display device and a storage including the display device and, more particularly, to a vehicle display device disposed inside a vehicle and configured to output video information and a storage including the display device.

BACKGROUND

A vehicle may include a center fascia display that provides various types of service information related to, for example, navigation, vehicle management and manipulation, Internet communication, offices, entertainment, telematics, and the like. In some examples, the center fascia display may be operated based on touch input.

In some cases, a vehicle may include a guide that is disposed at the dashboard of a vehicle and extends in left and right directions of the vehicle.

In some cases, a vehicle may include a plurality of displays. The plurality of displays may be movably mounted in the guide. For instance, the plurality of displays may move in the left or right direction along the guide. Accordingly, the driver in the driver's seat and the passenger in the passenger seat may use the plurality of displays in a selective manner.

The plurality of displays may display different pieces of information from one another depending on whether the displays are located in the center fascia area or in the passenger seat area. For example, the displays may provide the driver and the passenger with different pieces of information according to the driver and the passenger, respectively.

In some cases, adjacent displays among the plurality of displays may form a single screen. That is, each of adjacent displays may output a part of video information, and thus the adjacent displays may define a single screen that displays complete video information.

For example, a vehicle may include five displays, and the driver may selectively use one to five displays as needed. For instance, the driver may use three displays among the five displays for the purpose of navigation. Then, the passenger in the passenger seat may use the other two displays. In some cases, the driver may use all of the five displays for the purpose of the Internet or entertainment.

In some cases, an available surface area of the dashboard may decrease due to the installation of the guide. For example, a control board of an audio system or an air conditioner may not be installed in the portion of the dashboard where the guide is already installed.

In some cases, the available surface area of the dashboard may decrease due to the displays. The displays may move in the left or right direction in front of the dashboard, and in the moving process, the displays may hide parts of the front side of the dashboard. As a result, a control board of an audio system or an air conditioner may not be installed in the portion of the dashboard where the displays move along the guide.

The front side of the displays may be a display screen. In some cases, it may be difficult to form a completely flat screen by bringing two separate displays into close contact with each other.

In some cases, the displays may move along the guide within a tolerance between the displays and the guide, and a line between the displays forming a single screen may be visible to the user.

In some examples, a display apparatus for a vehicle may include a display unit and a processor. The display unit may include a main display and a sub display disposed behind the main display. The sub display may move in one direction behind the main display.

The sub display may be hidden by the main display, and the screen of the display unit is accordingly reduced. The sub display may protrude to one side of the main display, and the screen of the display unit is accordingly extended.

In some cases, a stepped portion may be formed between the main display and the sub display, and a visible line may be formed between the main display and the sub display when the screen of the display unit is extended. Accordingly, when the screen of the display unit is extended, the main display and the sub display may not form a single screen.

In addition, a control board of an audio system or an air conditioner may not be installed behind a protruding portion of the sub display. For example, when the screen of the display unit is extended, that is, when the sub display protrudes to one side of the main display, the available surface area of the dashboard may be reduced due to the sub display.

SUMMARY

The present disclosure describes a vehicle display device and a vehicle storage, where the surface area of the screen of the display may be increased or decreased without affecting the available surface area of the dashboard.

The present disclosure also describes a vehicle display device and a vehicle storage, where the surface area of the screen of the display may be variously adjusted, and at the same time, a seamless single screen may be defined.

The present disclosure further describes a vehicle display device and a vehicle storage, where the available surface area of the dashboard may be increased in conjunction with the adjustment of the surface area of the screen of the display.

According to one aspect of the subject matter described in this application, a vehicle display device is configured to be mounted at a housing within a vehicle and to open and close an opening defined at the housing. The vehicle display device includes a first frame configured to be disposed at the opening, a second frame disposed at the first frame and configured to move relative to the first frame, a roller rotatably disposed at the second frame, a third frame disposed at a back surface of the second frame and configured to move relative to the second frame, and a display disposed at a front surface of the first frame and wound around the roller to connect to the third frame. The vehicle display device is configured to open and close at least a portion of the opening, where a size of the opened portion corresponds to a movement distance of the second frame with respect to the first frame.

Implementations according to this aspect may include one or more of the following features. For example, the display may include a first area that is configured to output first data and faces a forward direction of the first frame and the second frame, a second area that is configured to output second data and faces a backward direction of the second frame and the third frame, and a third area that connects the first area to the second area and is configured to output third data in a radial direction of the roller. The vehicle display device may be configured to decrease a size of the first area based on increasing the size of the opened portion. In some examples, the second area and the third area of the display may be configured to output the second data and the third data, respectively, to an inside of the housing in a state in which at least the portion of the opening is opened.

In some implementations, the display may include a display panel having a first surface configured to output data, and a back plate that is attached to a second surface of the display panel opposite to the first surface and that supports the third area of the display. In some examples, the back plate may define a plurality of through holes that extend in parallel to an axial direction of the roller.

In some implementations, the vehicle display device include a first actuator configured to move the first frame and the third frame in opposite directions to each other with respect to the second frame. For instance, the first actuator may include a bracket coupled to the second frame, a first motor disposed at the bracket, a driving gear configured to be rotated by the first motor, a first screw rotatably disposed at the bracket, a second screw that is rotatably disposed at the bracket and extends in parallel to the first screw, a first driven gear engaged with the driving gear and configured to rotate the first screw, a second driven gear engaged with the driving gear and configured to rotate the second screw, a first mounting part coupled to the first frame and to the first screw, and a second mounting part coupled to the third frame and to the second screw. The first actuator may be configured to, based on rotation of the driving gear, move the first mounting part and the second mounting part in opposite directions to each other.

In some examples, the vehicle display device may include a magnetic member disposed at the second frame, and a hall sensor disposed at the first frame and configured to detect the magnet member to allow the first motor to change a rotation speed. In some examples, the first frame may be configured to be mounted at the housing and to move relative to the housing, where the size of the opened portion corresponds to a movement distance of the first frame with respect to the housing.

In some implementations, the first frame may be configured to be guided by a rail defined at the housing, and the vehicle display device may include a second actuator configured to move the first frame along the rail. In some examples, the second actuator may include a rack that is defined at the first frame and extends in parallel to the rail, and a pinion configured to engage with the rack and to be rotated by a motor. In some examples, the vehicle display device may include a magnet disposed at the first frame and configured to be detected by a hall sensor disposed at the housing, where the hall sensor is configured to detect the magnet to allow the motor to change a rotation speed.

In some implementations, the vehicle display device may include a plurality of support bars that are disposed between the display and the second frame and between the display and the roller. In some examples, the plurality of support bars may be attached to the display. In some examples, the roller may include a plurality of projections disposed at an outer surface of the roller and configured to catch the plurality of support bars. In some implementations, the vehicle display device may include a chain that connects the first frame to the third frame and is disposed between the display and the second frame and between the display and the roller.

In some implementations, the vehicle display device may include a push member disposed at the second frame and configured to push the roller in a direction away from the first frame. In some examples, the push member may include a contact member configured to come into contact with the roller, and a spring disposed between the contact member and the second frame.

According to another aspect, a vehicle display device is configured to be mounted to a housing within a vehicle and to open and close an opening defined at the housing. The vehicle display device includes a first frame disposed at an upper portion of the opening, a second frame disposed at the first frame and configured to move relative to the first frame to thereby selectively cover a lower portion of the opening, a third frame disposed at a back surface of the second frame and configured to move relative to the second frame, and a display disposed at a front surface of the first frame and curved around a lower portion of the second frame to connect to the third frame. The vehicle display device is configured to open and close at least a portion of the opening, where a size of the opened portion corresponds to a movement distance of the second frame with respect to the first frame.

Implementations according to this aspect may include features similar to or the same as one or more of the features of the vehicle display device described above.

According to another aspect, a vehicle storage includes a housing that is disposed within a vehicle and defines an opening, and a vehicle display device disposed at the opening and configured to extend to cover the opening and to shrink to open at least a portion of the opening. Implementations according to this aspect may include features similar to or the same as one or more of the features of the vehicle display device described above.

In some implementations, the inner space of the housing may be opened or closed in association with adjustment of the surface area of the screen of the vehicle display device and movement of the screen, and thus the inner space of the housing may be used as a selective storage.

In some implementations, when the display opens the opening, the second area and the third area of the display may visually output second data and third data into the housing. Accordingly, even where no lighting is installed inside the housing, the light outputted from the second area and the third area of the display may illuminate the inner space of the housing.

BRIEF DESCRIPTION OF THE DRAWINGS

The use of the same reference numerals or symbols in different drawings indicates similar or identical items.

DETAILED DESCRIPTION

Figure 1:
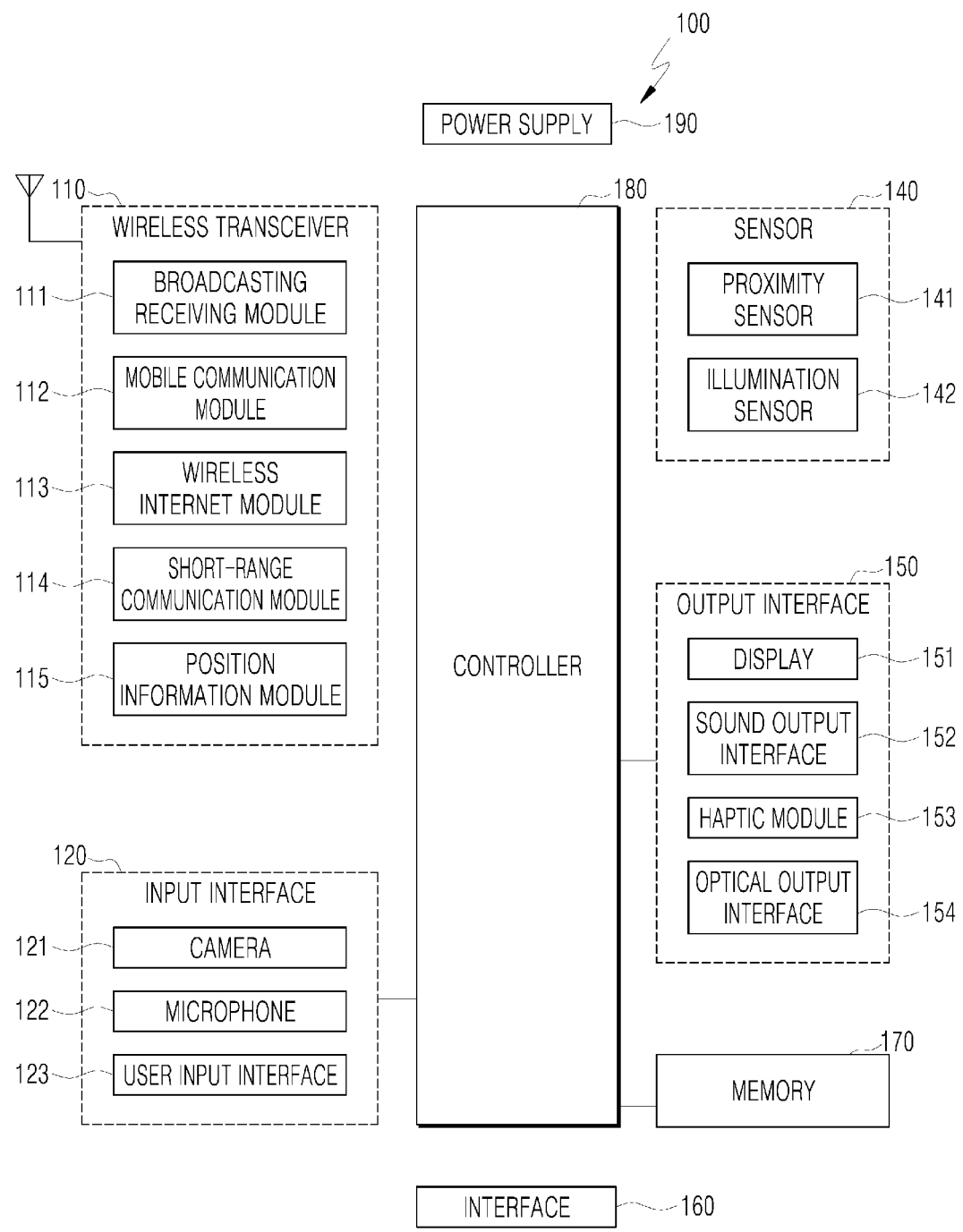
FIG. 1 is a block diagram illustrating example components of a vehicle display device.

Hereinafter, one or more implementations of the present disclosure will be described in detail with reference to accompanying drawings, and the same or similar elements are designated with the same numeral references regardless of numerals in the drawings and their redundant description will be omitted. The accompanying drawings are merely used to help easily understand implementations of the present disclosure, and it should be understood that the technical idea of the present disclosure is not limited by the accompanying drawings, and these implementations include all changes, equivalents or alternatives within the idea and the technical scope of the present disclosure.

FIG. 1 is a block diagram illustrating an example of a vehicle display device 100.

The vehicle display device 100 may include a wireless transceiver 110, an input interface 120, a sensor 140, an output interface 150, an interface 160, a memory 170, a controller 180, and a power supplier 190. In some examples, the vehicle display device may include more or fewer components than the components illustrated in FIG. 1.

In some implementations, the wireless transceiver 110 may include one or more modules which enable wireless communications between the vehicle display device 100 and a wireless communication system, between the vehicle display device 100 and another vehicle display device 100, or between the vehicle display device 100 and an external server. Further, the wireless transceiver 110 may include one or more modules which connect the vehicle display device 100 to one or more networks.

The wireless transceiver 110 may include at least one of a broadcasting receiving module 111, a mobile communication module 112, a wireless Internet module 113, a short-range communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive input of information from a user. Voice data or image data collected by the input interface 120 may be analyzed to be processed as a control command of the user.

The sensor 140 may include one or more sensors configured to sense at least one of information in the vehicle display device, information of surrounding environment of the vehicle display device, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121 and the microphone 122), a battery gauge, an environment sensor (for example, a barometer, a hygrometer, a thermometer, a radiation sensor, a thermal sensor, and a gas sensor), or a chemical sensor (for example, an electronic nose, a healthcare sensor, and a biometric sensor). Further, the vehicle display device disclosed in the present specification may combine information sensed by at least two sensors from the above-mentioned sensors and use the combined information.

The output interface 150 may generate outputs related to visual, auditory, or tactile senses, and may include at least one of a display 151, a sound output interface 152, a haptic module 153, or an optical output interface 154. The display 151 may form a mutual layer structure with a touch sensor or may be formed integrally with a touch sensor, to be embodied as a touch screen. Such a touch screen may serve as a user input interface 123 providing an input interface between the vehicle display device 100 and the user, and at the same time, may serve as an output interface between the vehicle display device 100 and the user.

The interface 160 may serve as a passage between the vehicle display device 100 and various types of external devices connected to the vehicle display device 100. The interface 160 may include at least one of a wired/wireless headset port, an external charger port, a wired/wireless data port, a memory card port, a port for connecting a device equipped with an identification module, an audio input/ output (I/O) port, a video input/output (I/O) port, or an earphone port. In response to a connection of an external device to the interface 160, the vehicle display device 100 may perform an appropriate control related to the connected external device.

Further, the memory 170 may store data which support various functions of the vehicle display device 100. The memory 170 may store a plurality of application programs or applications driven in the vehicle display device 100, data for operations of the vehicle display device 100, and commands. At least some of the application programs may be downloaded from an external server through wireless communication. Further, at least some of the application programs, related to basic functions of the vehicle display device 100 (for example, incoming and outgoing call functions and message receiving and sending functions), may be installed in the vehicle display device 100 before the vehicle display device 100 is released. The application programs may be stored in the memory 170, installed in the vehicle display device 100, and driven such that operations (or functions) of the vehicle display device 100 are performed by the controller 180.

In addition to the operations related to the application programs, the controller 180 may control the overall operation of the vehicle display device 100. The controller 180 may process signals, data, or information inputted or outputted through the above-described components, or drive the application programs stored in the memory 170, to thereby provide or process appropriate information or functions for the user.

Further, in order to drive an application program stored in the memory 170, the controller 180 may control at least some of the components described with reference to FIG. 1. Moreover, the controller 180 may operate a combination of at least two of the components included in the vehicle display device 100 in order to drive an application program. For example, the controller 180 may include one or more processors, a computer, an electric circuit, a microprocessor, or the like.

The power supplier 190 may, under the control of the controller 180, receive external power, and supply the power to each component included in the vehicle display device 100. At least some of the above-described components may operate in cooperation with one another to implement the operation, the control, or the control method of the vehicle display device 100 according to various exemplary embodiments, which will be described below. Further, the operation, the control, or the control method of the vehicle display device 100 may be implemented in the vehicle display device 100 by driving at least one application program stored in the memory 170.

Hereinafter, prior to describing various examples implemented by the vehicle display device 100 described above, the above-mentioned components will be described in more detail with reference to FIG. 1.

The wireless transceiver 110 will be described below. The broadcasting receiving module 111 of the wireless transceiver 110 may receive a broadcasting signal and/or broadcasting-related information from an external broadcasting management server through a broadcasting channel. The broadcasting channel may include a satellite channel and a ground wave channel. In order to receive at least two broadcasting channels at a time or for broadcasting channel switching, two or more broadcasting receiving modules may be provided in the vehicle display device 100.

The broadcasting management server may refer to a server that generates and transmits a broadcasting signal and/or broadcasting-related information, or a server that is provided with a previously generated broadcasting signal and/or broadcasting-related information and transmits the provided broadcasting signal and/or the broadcasting-related information to the vehicle display device 100. The broadcasting signal may include not only a TV broadcasting signal, a radio broadcasting signal, and a data broadcasting signal, but also a broadcasting signal generated by combining a TV broadcasting signal or a radio broadcasting signal with a data broadcasting signal.

The broadcasting signal may be encoded according to at least one technical standard for transmitting and receiving a digital broadcasting signal (or broadcasting schemes, such as ISO, IEC, DVB, or ATSC), and the broadcasting receiving module 111 may receive the digital broadcasting signal by using a method appropriate for the technical specification determined by the technical standard.

The broadcasting-related information may refer to information related to a broadcasting channel, a broadcasting program, or a broadcasting service provider. The broadcasting-related information may also be provided through a mobile communication network. In some cases, the broadcasting-related information may be received by the mobile communication module 112.

The broadcasting-related information may exist in various types, such as an electronic program guide of digital multimedia broadcasting (DMB) or an electronic service guide of a digital video broadcast-handheld (DVB-H). The broadcasting signal and/or the broadcasting-related information received by the broadcasting receiving module 111 may be stored in the memory 170.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various types of data for transmission or reception of text/multimedia messages.

The wireless Internet module 113 refers to a module for wireless Internet access and may be built in or external to the vehicle display device 100. The wireless Internet module 113 may be configured to transmit/receive a wireless signal in a communication network according to wireless Internet technologies.

Wireless Internet technologies may include, for example, wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 113 may transmit or receive data in accordance with at least one wireless Internet technology from among the above-mentioned Internet technologies to other types of Internet technologies.

From the viewpoint that the wireless Internet connection by WiBro, HSDPA, HSUPA, GSM, CDMA, WCDMA, LTE, LTE-A, etc. is performed through a mobile communication network, the wireless Internet module 113 which performs the wireless Internet access through the mobile communication network may be understood as a type of the mobile communication module 112.

The short-range communication module 114 may be for short-range communications, and may support short-range communications by using at least one of Bluetooth™, radio frequency identification (RFID), infrared data association (IrDA), ultra wideband (UWB), ZigBee, short-range communication (NFC), wireless fidelity (Wi-Fi), Wi-Fi direct, or wireless universal serial bus (Wireless USB). The short-range communication module 114 may support wireless communications between the vehicle display device 100 and the wireless communication system, between the vehicle display device 100 and another vehicle display device 100, or between a network where the vehicle display device 100 is located and a network where another vehicle display device 100 (or external server) is located, through a short-range wireless communication network. The short-range wireless communication network may be a short-range wireless personal area network.

The position information module 115 may be a module for obtaining the position (or the current position) of the vehicle display device 100. The representative examples of the position information module 115 may include a global positioning system (GPS) module or a Wi-Fi module. For example, when a GPS module is utilized, the vehicle display device 100 may obtain the position of the vehicle display device 100 by using a signal transmitted from a GPS satellite. As another example, when a Wi-Fi module is utilized, the vehicle display device 100 may obtain the position of the vehicle display device 100 on the basis of information of a wireless access point (AP) which transmits and receives wireless signals to and from the Wi-Fi module. In some cases, the position information module 115 may perform a function of another module of the wireless transceiver 110 to alternatively or additionally obtain data on the position of the vehicle display device 100. As a module used to obtain the position (or the current position) of the vehicle display device 100, the position information module 115 may not be limited to a module that directly calculates or obtains the position of the vehicle display device 100.

In some implementations, the input interface 120 may be configured to input video information (or video signals), audio information (or audio signals), data, or information inputted from the user. In order to receive input of video information, the vehicle display device 100 may include a camera 121 or a plurality of cameras 121. The camera 121 may process an image frame such as a still image or a moving image obtained by an image sensor in a video call mode or a photographing mode. The processed image frames may be displayed on the display 151 or stored in the memory 170. Further, the plurality of cameras 121 equipped in the vehicle display device 100 may be disposed to form a matrix structure, and a plurality of pieces of image information of various angles or focal points may be inputted to the vehicle display device 100 through the plurality of cameras 121 forming such a matrix structure. Further, the plurality of cameras 121 may be arranged in a stereo structure so as to obtain a left video and a right video for implementing a stereoscopic video.

The microphone 122 may process an external sound signal into electrical voice data. The processed voice data may be utilized in various ways in accordance with a function being performed by the vehicle display device 100 (or in accordance with an application program being executed). In some examples, the microphone 122 may implement various noise removal algorithms for removing noise generated during the process of receiving an external sound signal.

The user input interface 123 may receive information from the user. When information is inputted through the user input interface 123, the controller 180 may control the operation of the vehicle display device 100 so as to correspond to the inputted information. In some examples, the user input interface 123 may include a mechanical input interface (or a mechanical key, such as a button, a dome switch, a jog wheel, or a jog switch, located on a front, rear, or side surface of the vehicle display device 100) and a touch type input interface. In some examples, the touch type input interface may include a graphical key, a virtual key, a soft key, or a visual key, displayed on the touchscreen through a software process, or may include a touch key that is disposed on a portion other than the touchscreen. The virtual key or the visual key may be displayed on the touch screen in various shapes, and may include, for example, graphics, text, icons, video, or a combination thereof.

The sensor 140 may sense at least one of information in the vehicle display device 100, information of the surrounding environment of the vehicle display device 100, or user information, and generate a sensing signal corresponding to the sensed information. On the basis of the sensing signal, the controller 180 may control the driving or operation of the vehicle display device 100, perform data processing related to the application programs installed in the vehicle display device 100, or perform functions or operations. Representative sensors among the various sensors that may be included in the sensor 140 will be described in more detail below.

In some implementations, the proximity sensor 141 may be a sensor which senses the presence of an object that is approaching a predetermined sensing surface or the presence of nearby objects, by using the force of an electromagnetic field or infrared ray without any mechanical contact. The proximity sensor 141 may be disposed in an internal area of the vehicle display device 100, which is enclosed by the above-described touch screen, or in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect a proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position of the proximity touch refers to a position at which the object vertically corresponds to the touch screen at the time of the proximity touch. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximity touch operation and a proximity touch pattern sensed by the proximity sensor 141, and may output visual information corresponding to the processed data on the touch screen. Furthermore, the controller 180 may control the vehicle display device 100 such that different operations or data (or information) are processed depending on whether the touch on the same point on the touch screen is a proximity touch or a contact touch.

The touch sensor may sense a touch (or a touch input) applied to the touch screen (or the display 151) by using at least one of various touch sensing methods, such as a resistive film type, a capacitive type, an infrared type, an ultrasonic type, and a magnetic field type.

For example, the touch sensor may be configured to convert a change in a pressure that is applied to a specific portion of the touch screen or a change in a capacitance generated in a specific portion of the touch screen into an electrical input signal. The touch sensor may be configured to detect a position where a touch subject which applies a touch onto the touch screen touches the touch sensor, the surface area of the touch, the pressure of the touch, and the capacitance at the time of the touch. Here, the touch subject may be an object which applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. By doing so, the controller 180 may confirm which area of the display 151 was touched. Here, the touch controller may be a separate component from the controller 180, or may be the controller 180 itself.

The controller 180 may perform different controls or the same control depending on a type of a touch subject touching the touch screen (or a touch key additionally provided). Whether to perform different controls or the same control depending on the type of touch subject may be determined in accordance with an operating state of the vehicle display device 100 or an application program that is being executed.

The touch sensor and proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, and a hovering touch.

The ultrasonic sensor may recognize position information of a sensing object by using an ultrasonic wave. The controller 180 may calculate a position of a wave generating source through information sensed by the optical sensor and a plurality of ultrasonic sensors. The position of the wave generating source may be calculated by using the property of light that light is much faster than an ultrasonic wave, that is, the time in which light reaches the optical sensor is much faster than the time in which the ultrasonic wave reaches the ultrasonic sensor. More specifically, the position of the wave generating source may be calculated by using a difference between arrival time of the ultrasonic wave and arrival time of the light, with the light as a reference signal.

As a component of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be laminated on a display element, and may be configured to scan a motion of a sensing object proximate to the touch screen. More specifically, the photo sensor may be formed by mounting a photo diode and a transistor (TR) in rows/columns and may scan contents disposed on the photo sensor by using an electrical signal which changes depending on the amount of light applied to the photo diode. That is, the photo sensor may calculate coordinates of a sensing object in accordance with a change in the amount of light, to thereby obtain position information of the sensing object.

The display 151 may display (output) information processed in the vehicle display device 100. For example, the display 151 may display execution screen information of an application program driven in the vehicle display device 100, or user interface (UI) information or and graphic user interface (GUI) information in accordance with the execution screen information.

Further, the display 151 may be configured as a stereoscopic display which displays a stereoscopic video.

A three-dimensional display type, such as a stereoscopic type (a glass type), an autostereoscopic type (a glass-free type), and a projection type (a holographic type), may be applied to the stereoscopic display.

The sound output interface 152 may output audio data received from the wireless transceiver 110 or stored in the memory 170 in a call signal reception mode, a phone-call mode, a recording mode, a speech recognition mode, or a broadcasting reception mode. The sound output interface 152 may also output a sound signal related to a function (for example, a call signal reception sound or a message reception sound) performed in the vehicle display device 100. The sound output interface 152 may include, for example, a receiver, a speaker, and a buzzer.

The haptic module 153 may generate various tactile effects that may be felt by the user. A representative example of the tactile effect generated by the haptic module 153 may be vibration. For example, the haptic module 153 may include an actuator configured to generate vibration. An intensity and a pattern of the vibration generated in the haptic module 153 may be controlled by a selection of the user or a setting of the controller 180. For example, the haptic module 153 may synthesize vibrations different from one another and output the synthesized vibrations, or sequentially output the different vibrations.

In addition to vibration, the haptic module 153 may generate various tactile effects, such as a pin arrangement which vertically moves to a contact surface the skin, an injection force or a suction force of air passing through an injection port or a suction port, a brush on the surface of the skin, an electrode contact, or a stimulation of an electrostatic force, or effects of reproducing a cold or hot sensation using a heat absorbing or heat emitting element.

The haptic module 153 may not only transmit a tactile effect through direct contact, but may also be implemented such that the user may feel a tactile effect through muscular sensation of a finger or an arm. Two or more haptic modules 153 may be provided in accordance with a configuration aspect of the vehicle display device 100.

The optical output interface 154 may output a signal for notifying an occurrence of an event by using light of a light source of the vehicle display device 100. Examples of the events generated in the vehicle display device 100 may include, for example, a message reception, a call signal reception, a missed call, an alarm, a schedule notification, an email reception, and an information reception through an application.

The signal outputted from the optical output interface 154 may be implemented as the vehicle display device 100 emits light of a single color or a plurality of colors to a front surface or a rear surface thereof. The output of the signal may end as the vehicle display device 100 senses the confirmation of the event by the user.

The interface 160 may serve as a passage to all external devices that are connected to the vehicle display device 100. The interface 160 may receive data from an external device or may be supplied with the power source to transmit the supplied power source to each component in the vehicle display device 100, or may transmit data of the vehicle display device 100 to an external device. For example, the interface 160 may include a wired/wireless headset port, an external charger port, a wired/wireless data port, a memory card port, a port that connects a device equipped with an identification module, an audio input/output (I/O) port, a video input/output (I/O) port, an earphone port, etc.

In some implementations, the identification module may include an electric circuit or device, for example, a chip in which various information for authenticating user authority of the vehicle display device 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the vehicle display device 100 through the interface 160.

The memory 170 may store a program for an operation of the controller 180, or temporarily store input/output data (for example, a phone book, a message, a still image, a moving image, etc.). The memory 170 may store data related to vibration of various patterns or sound outputted when a touch is inputted to the touch screen.

The memory 170 may include at least one type of non-transitory storage medium from among a flash memory type memory, a hard disk type memory, a solid state disk (SSD) type memory, a silicon disk drive (SDD) type memory, a multimedia card micro type memory, a card type memory (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, or an optical disk. The vehicle display device 100 may operate in association with a web storage which performs a storage function of the memory 170 on the Internet.

As described above, the controller 180 may control the operation related to the application programs and the overall operation of the vehicle display device 100. For example, when the state of the vehicle display device 100 satisfies a predetermined condition, the controller 180 may perform a locking function which limits an input of a control command of a user for applications or may release the locking function.

Further, the controller 180 may perform control and processing related to a voice call, a data communication, and a video call, or perform a pattern recognition process by which a handwriting input or a picture drawing input performed on the touch screen may be recognized as a text or an image, respectively. Moreover, the controller 180 may control any one component or a combination of a plurality of the components described above, to implement various embodiments which will be described below on the vehicle display device 100.

The display 151 may display (output) information processed in the vehicle display device 100. For example, the display 151 may display execution screen information of an application program driven in the vehicle display device 100, or user interface (UI) information or and graphic user interface (GUI) information in accordance with the execution screen information.

The display 151 may include at least one of a liquid crystal display (LCD), a thin film transistor liquid crystal display (TFT LCD), an organic light emitting diode (OLED), a three-dimensional display (3D display), an electronic ink display (e-ink display), or other types of flexible displays.

Further, the display 151 may be two or more displays 151 depending on the implementation of the vehicle display device 100. Here, a plurality of displays 151 may be disposed to be spaced apart from each other or integrally disposed on one surface of the vehicle display device 100 or may be disposed on different surfaces of the vehicle display device 100.

The display 151 may include a touch sensor configured to sense a touch on the display 151 so as to receive input of a control command through the touch input method. When a touch is made on the display 151, the touch sensor may sense the touch, and on the basis of the sensed touch, the controller 180 may generate a control command corresponding to the sensed touch. Contents inputted through the touch input method may include letters, numbers, and menu items which may be indicated or designated in various modes.

The microphone 122 may be configured to receive voice of the user or other sounds. The microphone 122 may be provided in a plurality of positions so as to receive stereo sounds.

The interface 160 may serve as a passage connecting the vehicle display device 100 to external devices. For example, the interface 160 may be at least one from among a connection terminal for a connection with other devices (including an earphone or an external speaker), a port for short-range communication (for example, an infrared port (IrDA port), a Bluetooth port, a wireless LAN port, etc.), or a power supplier terminal for supplying power to the vehicle display device 100. The interface 160 may be embodied in the form of a socket which accommodates an external card, such as a subscriber identification module (SIM), a user identity module (UIM), and a memory card for information storage.

In some examples, the vehicle display device 100 may include at least one antenna for wireless communication. The antenna may be embedded in the vehicle display device 100 or may be disposed in another case. For example, an antenna of the broadcasting receiving module 111 (see FIG. 1) may be drawn from and insert into the vehicle display device 100. Alternatively, the antenna may be a film type antenna attached to an inner side surface of the housing. In some examples, a case including a conductive material may be configured to serve as an antenna.

Hereinafter, description will be made for each of the upper and lower parts of the illustration, for easy understanding of the present disclosure. Also, description will be made for each of the front and back parts of the illustration, for easy understanding of the present disclosure.

Figure 5:
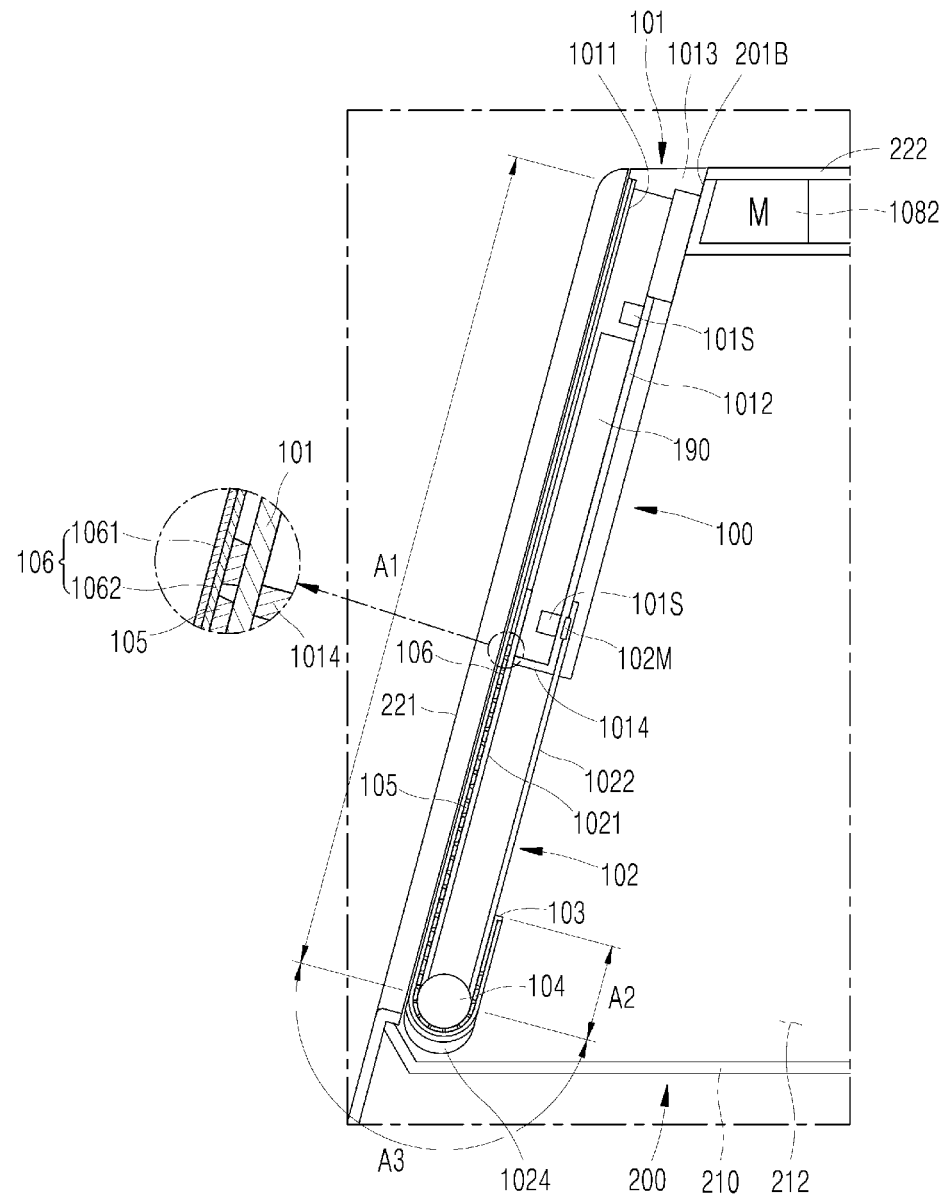
FIG. 5 is a cross-sectional view illustrating the vehicle storage of FIG. 2 with the opening closed.

The direction towards a storage space 212 from a vehicle display device 100 will be referred to as a "rear" or "back" of the vehicle display device 100. The opposite direction to the "rear" or "back" of the vehicle display device 100 will be referred to as a "front" of the vehicle display device 100. In FIG. 5, the "rear" or "back" of the vehicle display device 100 refers to the rightward direction. In FIG. 5, the "front" of the vehicle display device 100 refers to the leftward direction.

Figure 2:
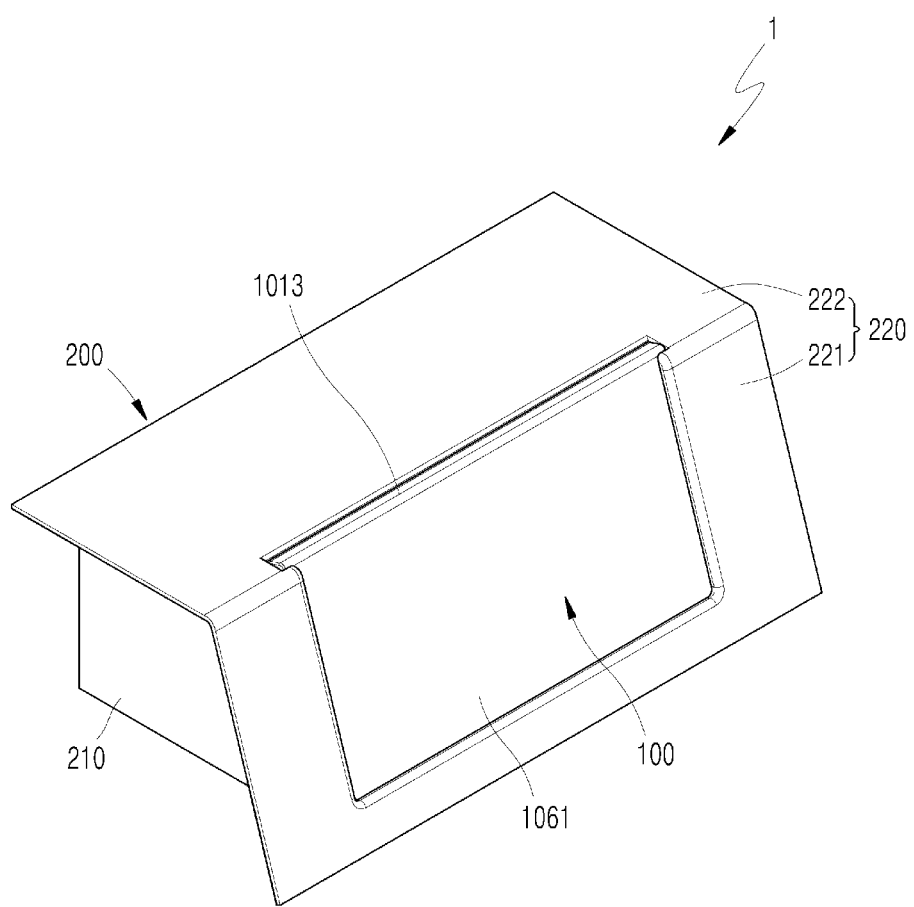
FIG. 2 is a perspective view illustrating an example of a vehicle storage with an opening that is closed by an example of a vehicle display device.
Figure 3:
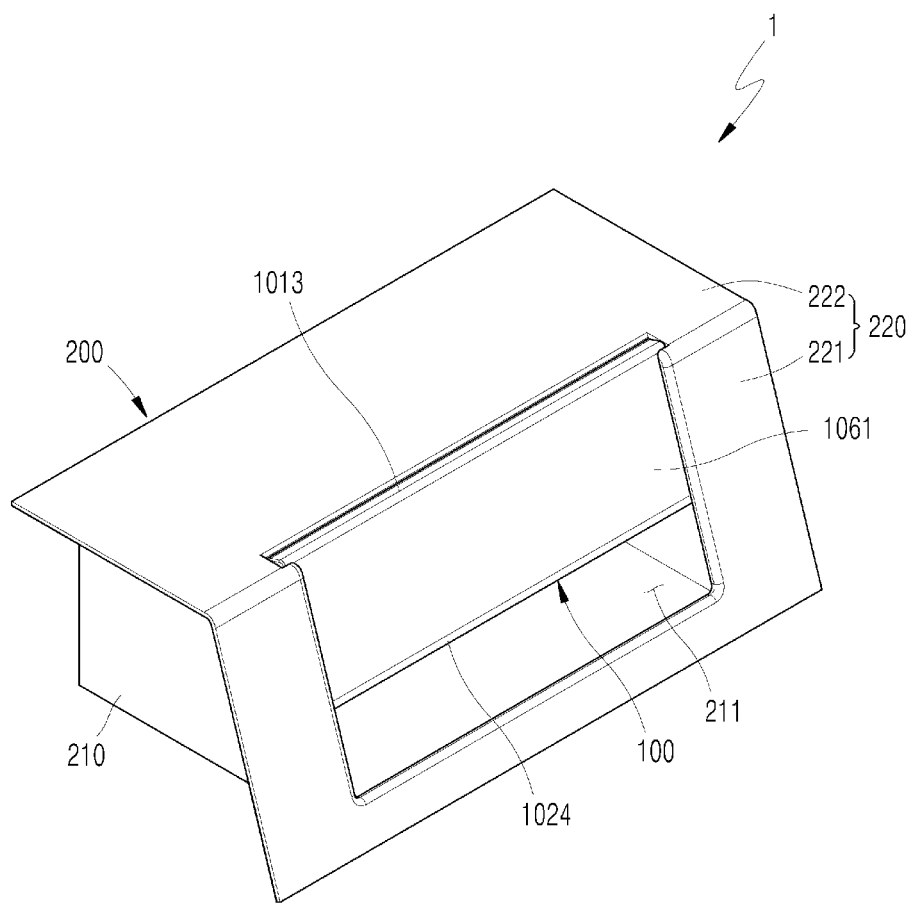
FIG. 3 is a perspective view illustrating the vehicle storage of FIG. 2 with the opening in an example of a first open state.
Figure 4:
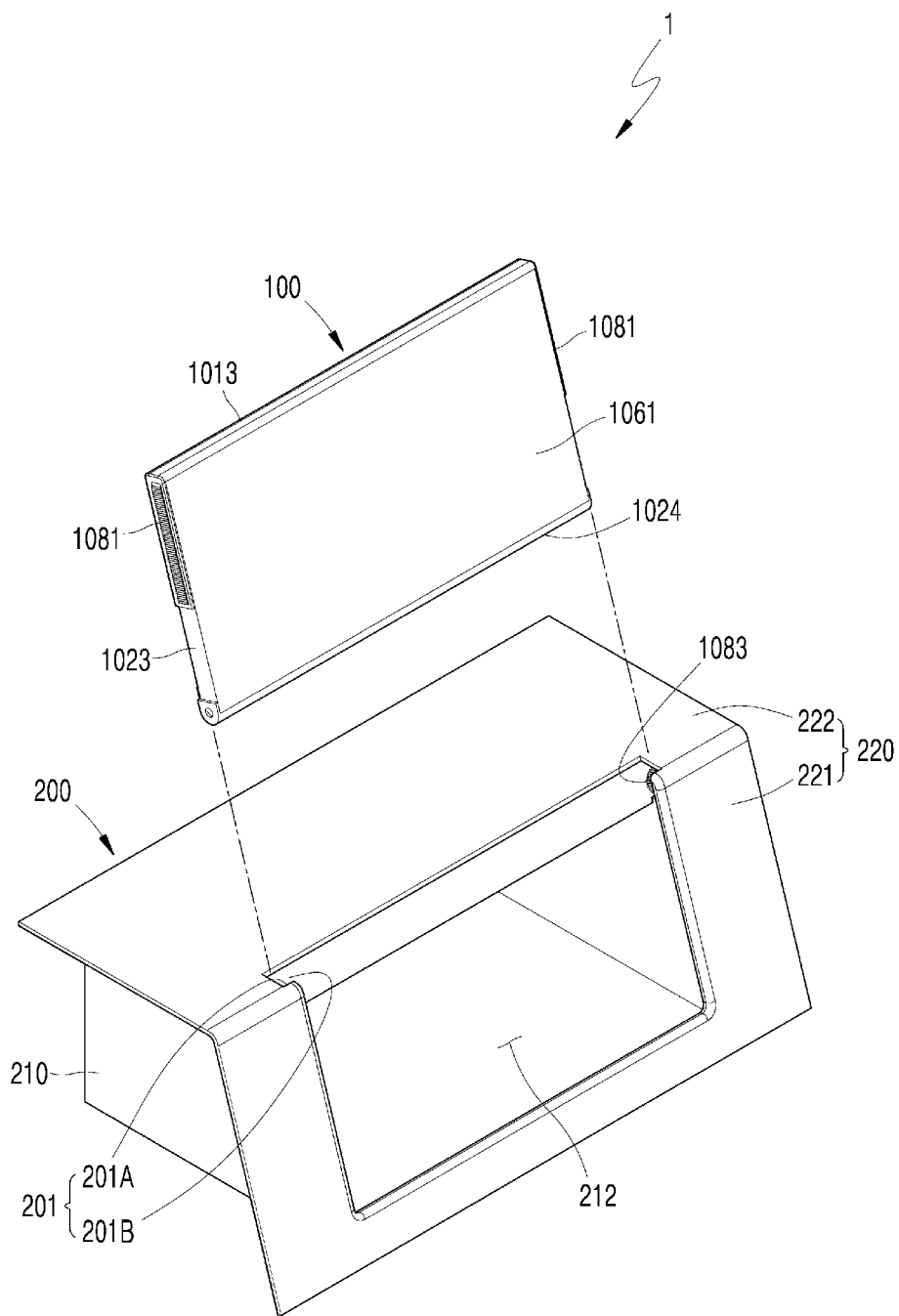
FIG. 4 is a perspective view illustrating the vehicle storage of FIG. 2 including an example of a housing and an example of a vehicle display device separated from the housing.

FIG. 2 is a perspective view showing an example of a vehicle storage 1 with an opening 211 that is in a closed state. FIG. 3 is a perspective view showing the vehicle storage 1 of FIG. 2 and the opening 211 in a first open state. FIG. 4 is a perspective view showing the vehicle storage 1 of FIG. 2 including an example of a housing 200 and an example of a vehicle display device 100 separated from the housing 200.

In some implementations, an opening 211 of a vehicle storage 1 may be opened or closed by a vehicle display device 100. The opening 211 may be opened or closed in a sliding direction of a second frame 102 with respect to a first frame 101 (hereinafter, this direction will be referred to as a "first movement direction").

In some examples, the opening 211 may be opened or closed in a sliding direction of the first frame 101 with respect to a housing 200 (hereinafter, this direction will be referred to as a "second movement direction"). The first movement direction and the second movement direction may align with each other. Hereinafter, description will be made on the assumption that the first movement direction and the second movement direction align with each other.

The first movement direction and the second movement direction may be upward and downward directions. In some examples, the first movement direction and the second movement direction may be leftward and rightward directions. In other examples, the first movement direction and the second movement direction may be inclined relative to the upward and downward directions. In some examples, the first movement direction and the second movement direction may be inclined relative to the leftward and rightward directions.

In FIGS. 2 to 4, the first movement direction and the second movement direction are illustrated as being inclined relative to the upward and downward directions. Hereinafter, a direction to which the opening 211 is opened will be referred to as an "opening direction." Hereinafter, a direction to which the opening 211 is closed will be referred to as a "closing direction."

As illustrated in FIGS. 2 to 4, the vehicle storage 1 may include a housing 200 and a vehicle display device 100.

As shown in FIGS. 3 and 4, the housing 200 may form a storage space 212 inside the vehicle. The housing 200 may be formed on a dashboard of the vehicle. The housing 200 may include a body 210 and a cover 220.

The body 210 may form an opening 211 in the front thereof. The body 210 may be provided behind the cover 220. The body 210 may be coupled to a back surface of the cover 220 along the circumference of the opening 211.

In some examples, the cover 220 may be a portion of the dashboard. The dashboard may be a part in front of a driver's seat and a passenger's seat where various instruments and switches are located. The cover may be positioned above a center fascia between the driver's seat and the passenger's seat.

The cover 220 may include a front surface part 221 and a top surface part 222. The top surface part 222 may be a part positioned below a windshield 2. The top surface part 222 may form a surface facing approximately upward. The front surface part 221 may be a part that forms a continuous surface with the center fascia. The front surface part 221 may form a constant angle with the top surface part 222. A boundary portion between the front surface part 221 and the top surface part 222 may correspond to an upper end portion of the opening 211.

In some examples, as illustrated in FIG. 4, the housing 200 may define a rail 201 guiding the sliding movement of the first frame 101.

For example, the rail 201 may include a first rail surface 201A and a second rail surface 201B. The first rail surface 201A may cover a front side edge of the vehicle display device 100. The second rail surface 201B may cover a back side edge of the vehicle display device 100.

The first rail surface 201A and the second rail surface 201B may help to prevent shaking of the vehicle display device 100 caused by an external force such as vibration of the vehicle. In some cases, when the vehicle display device 100 moves in the second movement direction, the rail 201 may not restrict the sliding movement of the vehicle display device 100.

As shown in FIGS. 2 and 3, the vehicle display device 100 may be disposed at the opening 211. The vehicle display device 100 may open and close the opening 211.

As illustrated in FIG. 2, when the vehicle display device 100 is extended, the opening 211 may be closed. The vehicle display device 100 may be extended in the closing direction. As illustrated in FIG. 3, when the vehicle display device 100 is reduced, the opening 211 may be opened. The vehicle display device 100 may be reduced in the opening direction. For instance, the vehicle display device 100 may configured to shrink a size (e.g., vertical length) of the vehicle display device 100 to thereby open a portion of the opening 211 of the housing 200.

Figure 6:
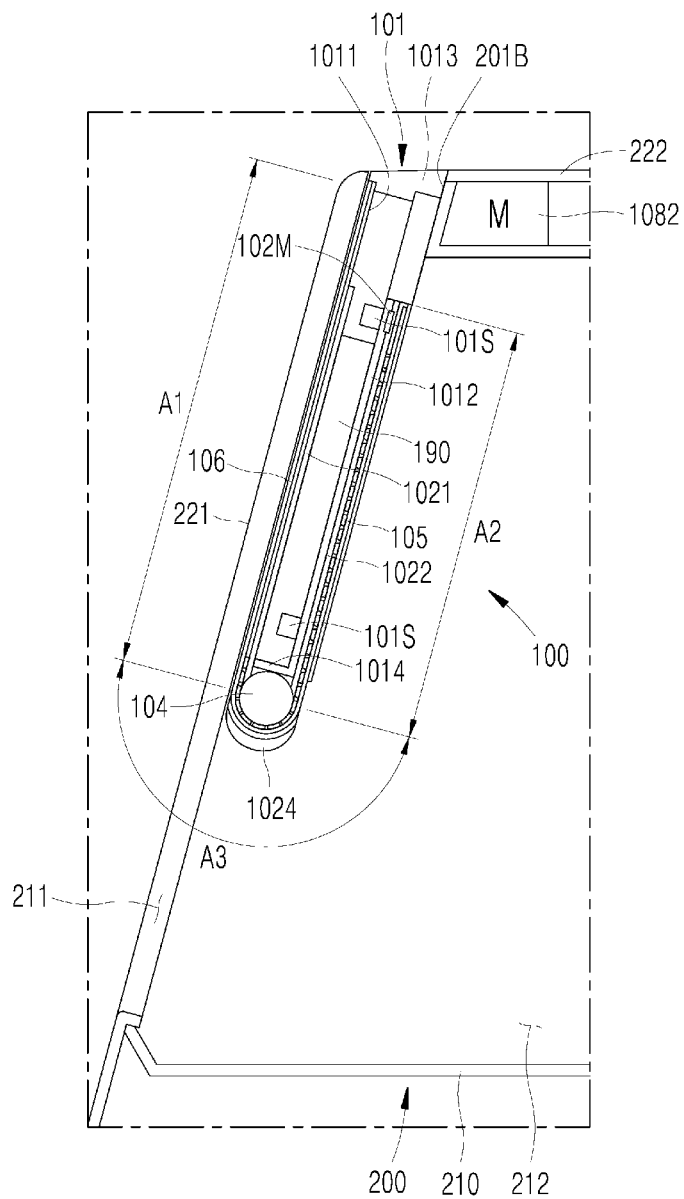
FIG. 6 is a cross-sectional view illustrating the vehicle storage of FIG. 3 with the opening in the first open state.

FIG. 5 is a cross-sectional view showing the vehicle storage 1 of FIG. 2 and the opening 211 in a closed state. FIG. 6 is a perspective view showing the vehicle storage 1 of FIG. 3 and the opening 211 in a first open state.

As illustrated in FIGS. 5 and 6, the vehicle display device 100 may include a first frame 101, a second frame 102, a third frame 103, a roller 104, a plurality of support bars 105, a display 106, a first actuator 107, and a second actuator 108.

The first frame 101 may be disposed in an upper portion of the opening 211. A controller 180 and a power supplier 190 may be coupled to the first frame 101. The first frame 101 may include a front surface part 1011, a back surface part 1012, and a side surface part 1013.

The front surface part 1011 may form a plane to which the display 106 is attached. The back surface part 1012 may be positioned behind the front surface part 1011. The back surface part 1012 may form a plane parallel to the front surface part 1011. The side surface part 1013 may connect the front surface part 1011 and the back surface part 1012. The side surface part 1013 may be provided along edges of the front surface part 1011 and the back surface part 1012.

As illustrated in FIGS. 5 and 6, the side surface part 1013 may form a left surface, a right surface, and a top surface of the first frame 101. When the opening 211 is closed and in the first open state, the top surface of the first frame 101 may form a continuous plane with the top surface part 222 of the cover 1024.

An open portion may be formed at the bottom of the first frame 101. The first frame 101 may include a fixing portion 1014. The fixing portion 1014 may be a portion to which the power supplier 190 is coupled. In the cross-sectional views of FIGS. 5 and 6, the fixing portion 1014 is illustrated as blocking the bottom of the first frame 101.

However, it should be understood that the fixing portion 1014 only partially covers the bottom of the first frame 101.

Accordingly, it should be understood that the fixing portion 1014 does not physically interfere with a push member 102P or the first actuator 107.

As illustrated in FIGS. 5 and 6, the second frame 102 may be mounted in the first frame 101 so as to move in a sliding manner. The opening 211 may be opened and closed as much as a movement distance of the second frame 102 with respect to the first frame 101.

The second frame 102 may include a front surface part 1021, a back surface part 1022, a side surface part 1023, and a cover 1024.

The front surface part 1021 may form a plane which supports the plurality of support bars 105. The back surface part 1022 may be positioned behind the front surface part 1021. The back surface part 1022 may form a plane parallel to the front surface part 1021.

The side surface part 1023 may connect the front surface part 1021 and the back surface part 1022. The side surface part 1023 may be provided along edges of the front surface part 1021 and the back surface part 1022. The side surface part 1023 may form left and right surfaces of the second frame 102. The side surface part 1023 may form a plane parallel to the side surface part 1013. Open portions may be formed at the top and bottom of the second frame 102.

An open portion may be formed at the top of the second frame 102. The front surface part 1021 and the side surface part 1023 may slide within the first frame 101 through the open portion at the bottom of the first frame 101. The front surface part 1021 may slide behind the front surface part 1011. The side surface part 1023 may slide inside the back surface part 1012. The back surface part 1022 may slide behind the back surface part 1012.

In some implementations, the first frame 101 may include a rail part that guides a sliding movement of the second frame and is disposed at an inner surface of the first frame 101. The rail part may extend in the first movement direction. The rail part may be disposed behind the front surface part 1011. The rail part may align with the front surface part 1011.

Left and right edges of the front surface part 1021 may be mounted in the rail part. Mounted in the rail part, the second frame 102 may slide such that the opening 211 is closed (see FIG. 5) and such that the opening 211 is in the first open state (see FIG. 6).

The cover 1024 may be coupled to an end portion of the bottom of the second frame 102. The user may store various items 3 in the vehicle storage 1. While an item 3 is being put into or taken out from the vehicle storage 1, a hand of the user may bump into a lower part of the vehicle display device 100. The cover 1024 may cover a third area A3 of a display panel 1061. The cover 1024 may block an external force applied to the third area A3.

The third frame 103 may be mounted in the back surface part of the second frame 102 so as to move in a sliding manner. The third frame 103 may form a long bar shape in a direction aligning with a longitudinal direction of the roller 104.

Figure 7:
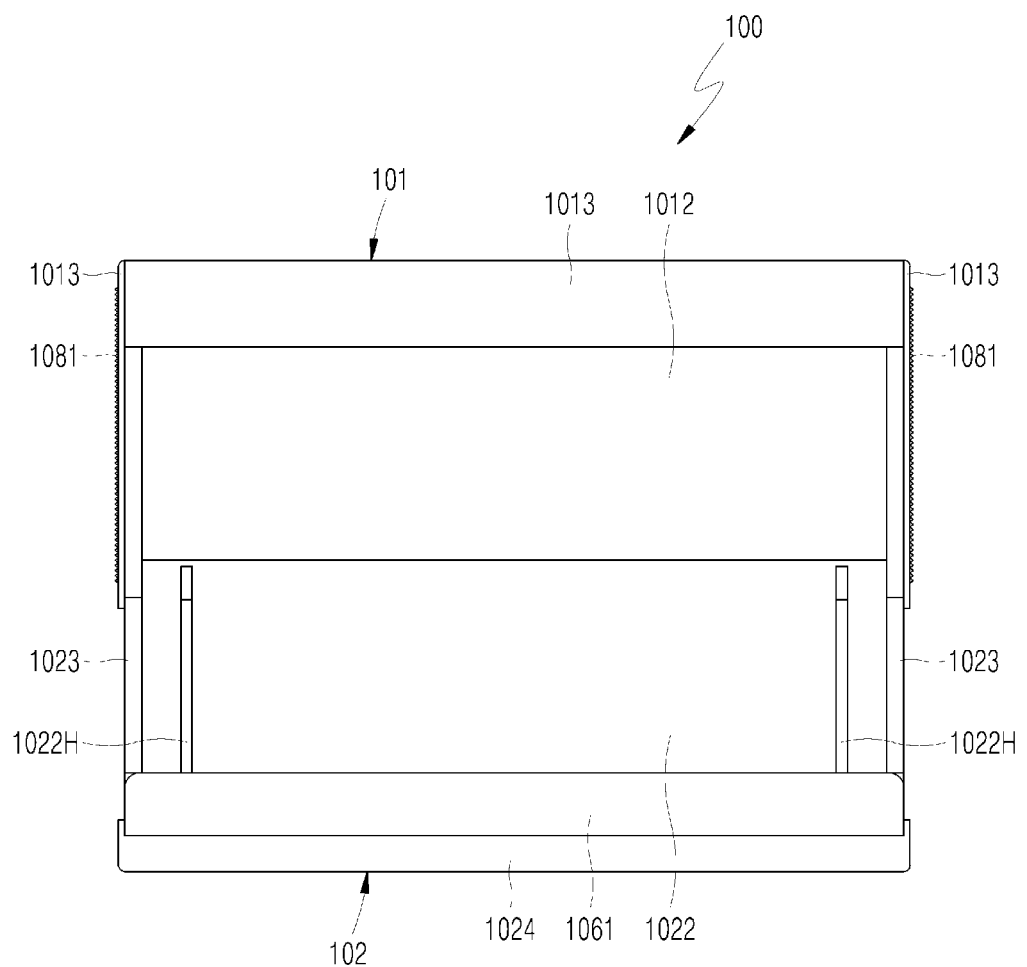
FIG. 7 is a rear view illustrating an example of a vehicle display device and the opening of the vehicle storage of FIG. 5 in a closed state.
Figure 8:
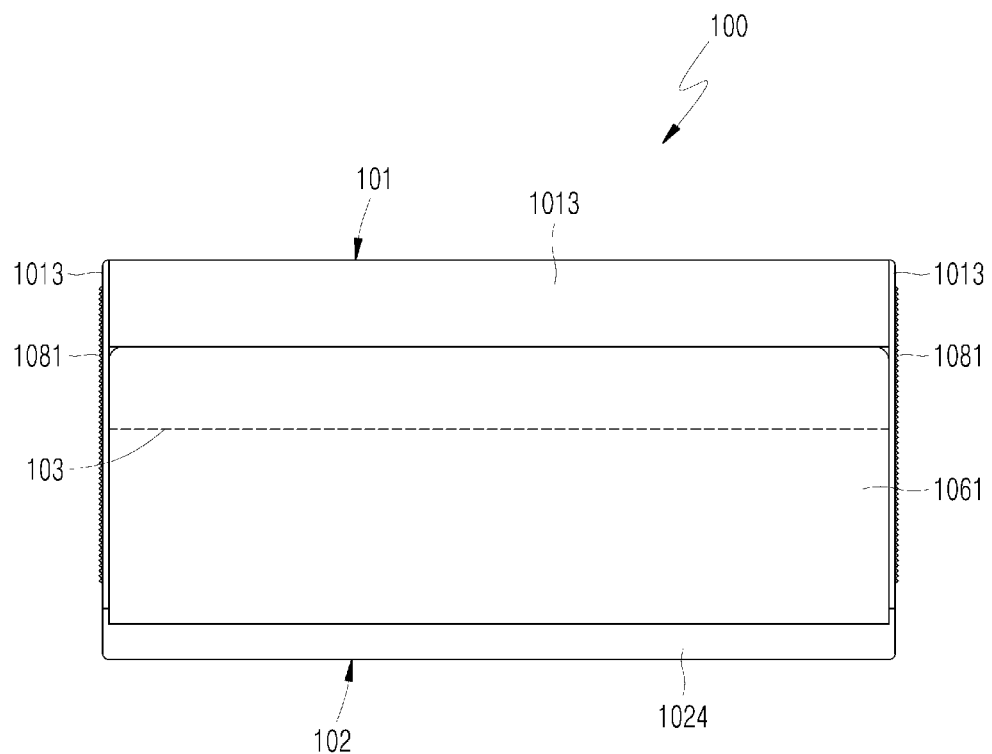
FIG. 8 is a rear view illustrating an example a vehicle display device and the opening of the vehicle storage of FIG. 6 in the first open state.

FIG. 7 is a rear view showing the vehicle display device 100 and the opening 211 of the vehicle storage 1 of FIG. 5 in a closed state. FIG. 8 is a rear view showing the vehicle display device 100 and the opening 211 of the vehicle storage 1 of FIG. 6 in the first open state.

As illustrated in FIGS. 7 and 8, a pair of slot holes 1022h may be formed in the back surface part of the second frame 102. The slot holes 1022H may be formed to extend in the first movement direction.

The third frame 103 may be coupled to second mounting parts 1079 that pass through the slot holes 1022H. When the first actuator 107 operates, the second mounting parts 1079 may move in the first movement direction. The third frame 103 may be slid in the first movement direction in the back surface part of the second frame 102 by the second mounting parts 1079.

As illustrated in FIGS. 5 and 6, the roller 104 may be rotatably mounted in the second frame 102. The roller 104 may form a long cylindrical shape in an orthogonal direction with regard to the first movement direction. The orthogonal direction with regard to the first movement direction may be the widthwise direction in the drawings.

In some examples, the roller 104 may include a rotational shaft disposed at both widthwise end portions of the roller 104. A hole or a groove may be formed at lower end portions of the side surface parts 1023. With the rotational shaft inserted into the hole or groove, the roller 104 may rotate by an external force.

As illustrated in FIGS. 5 and 6, the display 106 may connect the front surface part of the first frame 101 and the third frame 103 while being wound around the roller 104. The display 106 may include a display panel 1061 and a back plate 1062.

The display panel 1061 may visually output data. For the display panel 1061, a flexible display may be used. A flexible display refers to a durable display which has characteristics of existing flat panel displays, and is produced on a thin and flexible substrate which may be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information on it by using a twist ball or electrophoresis using a capsule.

When the flexible display is not transformed, that is, for example, when the flexible display has infinite curvature (hereinafter referred to as a "basic state"), a display area of the flexible display may be flat.

When the flexible display is transformed from the basic state, that is, for example, when the flexible display has finite curvature (hereinafter referred to as a "transformed state"), the display area of the flexible display may become curved. In the transformed state, displayed information may be visual information outputted to a curved surface of the flexible display.

Such visual information may be implemented as the light emission of unit pixels (sub pixels) disposed in a matrix form is independently controlled. A unit pixel refers to a minimum unit for implementing one color.

In the basic state, the flexible display may not be in a flat state but in a bent state (for example, a horizontally or vertically bent state). When an external force is applied to the flexible display in the basic state, the flexible display may be transformed to be flat (or to be less bent) or to be more bent.

Figure 9:
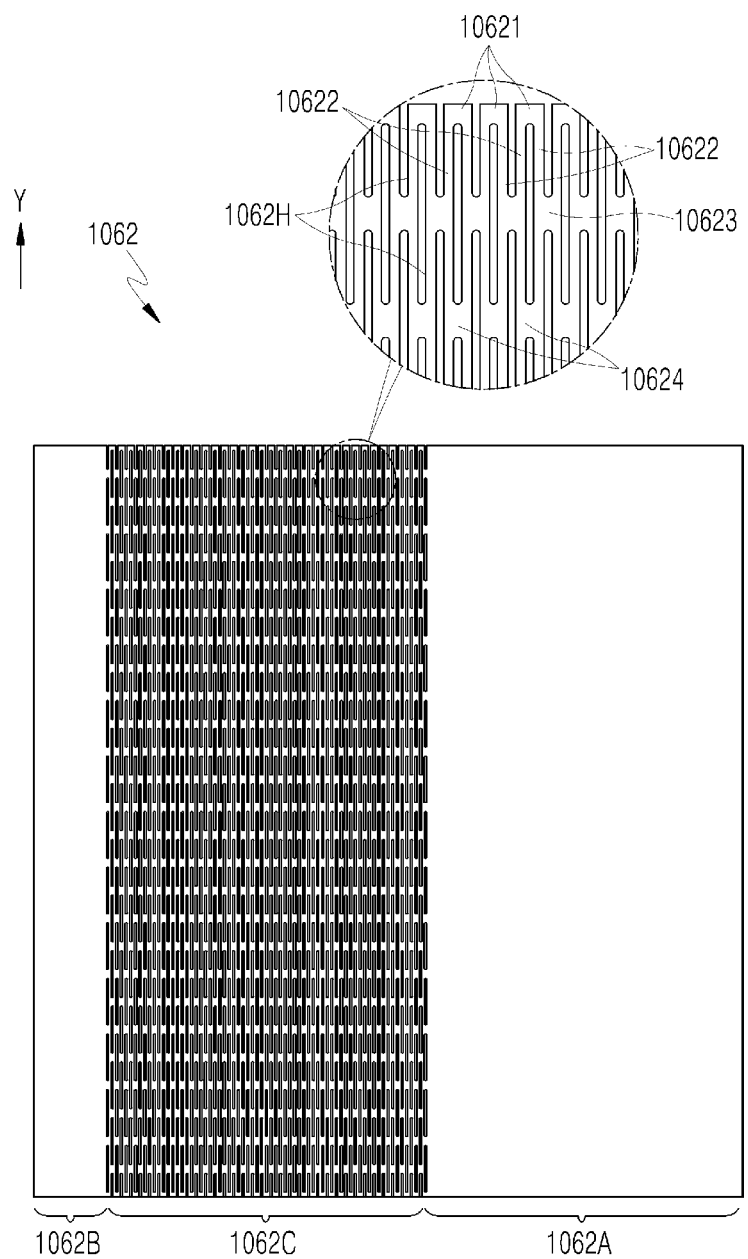
FIG. 9 is a view illustrating an example of a back plate of the vehicle display device of FIG. 5.

FIG. 9 is a view illustrating a back plate of the vehicle display device 100 of FIG. 5.

As shown in FIG. 9, the back plate 1062 may be attached to a surface of the display panel 1061 that is opposite to a surface thereof where data are outputted.

The back plate 1062 may be made of a metal plate having elasticity. The back plate 1062 may be produced to contain a super elastic metal. The back plate 1062 may allow elastic deformation and elastic restoration of the display 106 to be easily made. The back plate 1062 may have a form of a relatively thin plate.

The back plate 1062 may be one integral metal plate, and may include two or more areas. The back plate 1062 may include a first fixed area 1062A, a second fixed area 1062B, and a deformation area 1062C.

The first fixed area 1062A may be an area that is attached to the front surface part 1011 of the first frame 101. In the first fixed area 1062A, the back plate 1062 may be bilaterally symmetrical. The second fixed area 1062B may be an area that is attached to the back surface of the third frame 103. In the second fixed area 1062B, the back plate 1062 may be bilaterally symmetrical.

The deformation area 1062C may be an area that is bent by the roller 104 when the second frame 102 slides. The deformation area 1062C may support the third area A3 which is bent by the roller 104. In the deformation area 1062C, the back plate 1062 may be bilaterally symmetrical. A plurality of through holes 1062H, which are formed to extend in the axial direction of the roller 104, may be formed in the deformation area 1062C. The plurality of through holes 1062H may pass through the back plate 1062 in the deformation area 1062C.

As illustrated in FIG. 9, the deformation area 1062C may include edge portions 10621, horizontal connecting portions 10622, and first vertical connecting portions 10623.

The edge portions 10621 may be divided into a plurality of edge portions 10621 that form left and right edges of the back plate 1062. The edge portions 10621 may have a predetermined length along the length direction thereof, and may be spaced apart from each other.

The horizontal connecting portions 10622 may extend from the edge portions 10621 in the width direction. Two horizontal connecting portions 10622 may extend from a single edge portion 10621.

One first vertical connecting portion 10623 may connect two horizontal connecting portions 10622 each extending from two different edge portions 10621. That is, one first vertical connecting portion 10623 may connect two horizontal connection portions 10622 that extend from two adjacent edge portions 10621 and are adjacent to each other. The first vertical connecting portions 10623 may be formed repeatedly along the width direction. The first vertical connecting portions 10623 may be spaced apart from each other at equal intervals.

Second vertical connecting portions 10624 may be formed in the deformation area 1062C. One second vertical connecting portion 10624 may connect two horizontal connecting portions 10622 extending from a single edge portion 10621. The second vertical connecting portions 10624 may be formed repeatedly along the width direction. The second vertical connecting portions 10624 may be spaced apart from each other at equal intervals. The deformation area 1062C may be easily bent about a Y-directional axis by the plurality of through holes 1062H.

When a tensile force, which is an external force, is applied to the deformation area 1062C along the length direction thereof, the edge portions 10621 and the first vertical connecting portions 10623 may be deformed to be spaced apart from each other in the length direction with respect to the horizontal connecting portions 10622, and the length of the deformation area 1062C may thus be increased as a whole. When the external force is removed, the deformation area 1062C may be elastically recovered to its original state.

Also, when a tensile force, which is an external force, is applied to the deformation area 1062C along the length direction thereof, the first vertical connecting portions 10623 and the second vertical connecting portions 10624 may be deformed to be spaced apart from each other in the length direction with respect to the horizontal connecting portions 10622, and the length of the deformation area 1062C may thus be increased as a whole. When the external force is removed, the deformation area 1062C may be elastically recovered to its original state.

As illustrated in FIGS. 5 and 6, the display 106 may be divided into a first area A1, a second area A2, and a third area A3, based on the direction in which data are outputted. The first area A1, the second area A2, and the third area A3 may be divided based on the third area A3 which is wound around the roller 104.

The first area A1 may be an area that visually outputs first data in the forward direction of the first frame 101 and the second frame 102. The first area A1 may be an area that is exposed to the view of a passenger of the vehicle. Through the first area A1, various service information for navigation, vehicle management and manipulation, the Internet, offices, entertainment, telematics, etc. may be outputted.

A surface area of the first area A1 may decrease as the opening 211 is gradually opened. With the opening 211 in the closed state (see FIG. 5), the surface area of the first area A1 may be at a maximum. With the opening 211 in the first open state (see FIG. 6), the surface area of the first area A1 may be at a minimum. The controller 180 may output various service information for navigation, vehicle management and manipulation, the Internet, offices, entertainment, and telematics only to the first area A1.

The second area A2 may be an area that visually outputs second data in the backward direction of the second frame 102 and the third frame 103. In the second area A2, the display panel 1061 may face the storage space 212. The second area A2 may be an area that is not exposed to the view of a passenger of the vehicle. The controller 180 may not output the various service information, such as navigation information, through the second area A2.

A surface area of the second area A2 may increase as the opening 211 is gradually opened. With the opening 211 in the closed state (see FIG. 5), the surface area of the second area A2 may be at a minimum. With the opening 211 in the first open state (see FIG. 6), the surface area of the second area A2 may be at a maximum.

As illustrated in FIGS. 5 and 6, the third area A3 may be an area that visually outputs third data in a radial direction of the roller 104. The third area A3 may connect the first area A1 and the second area A2.

In the third area A3, the display panel 1061 may face the radial direction of the roller 104 between a normal direction of the first area A1 and a normal direction of the second area A2. A surface area of the third area A3 with the opening 211 in the closed state (see FIG. 5) may be the same as a surface area of the third area A3 with the opening 211 in the first open state (see FIG. 6). That is, the surface area of the third area A3 may remain the same regardless of the opening and closing of the opening 211.

Apart of the third area A3 may be exposed to the view of the driver of the vehicle. The third area A3 may be an area that is bent in the circumferential direction of the roller 104 between the normal direction of the first area A1 and the normal direction of the second area A2. Thus, even if various service information is outputted through the third area A3, the legibility of the outputted information may be poor. Accordingly, the controller 180 may not output the various service information, such as navigation information, through the third area A3.

Figure 10:
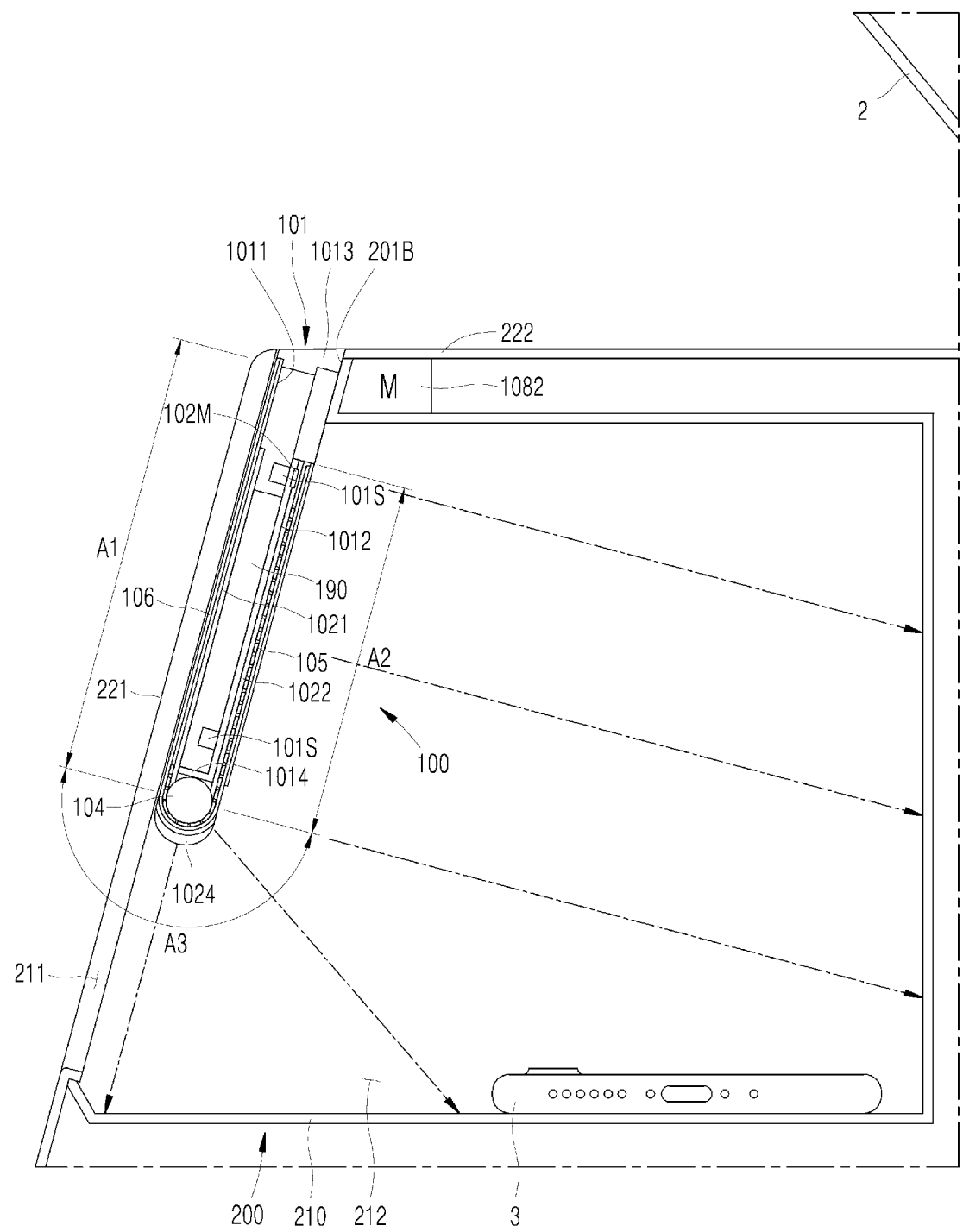
FIG. 10 is a cross-sectional view illustrating the vehicle storage of FIG. 6 and the opening in the first open state, where a second area and a third area of a display illuminate an inside of the housing.

FIG. 10 is a cross-sectional view showing the vehicle storage 1 of FIG. 6 and the opening 211 in the first open state, where with the second area A2 and the third area A3 of the display 106 illuminate the inside of the housing 200.

As illustrated in FIG. 10, with the opening 211 in the first open state, the second area A2 and the third area A3 may visually output the second data and the third data to the inside of the housing 200. In some examples, the housing 200 may be disposed below a windshield 2 of the vehicle.

As described in detail above, the second area A2 may be an area that is not exposed to the view of a passenger of the vehicle. In addition, even if various service information is outputted through the third area A3, the legibility of the outputted information may be poor. Here, the second data and the third data may be data for illuminating the inside of the housing 200. The second data and the third data may be data for outputting white light.

With the opening 211 in the first open state, the controller 180 may output the second data to the second area A2. In addition, with the opening 211 in the first open state, the controller 180 may output the third data to the third area A3. Accordingly, with the opening 211 in the first open state, the inside of the housing 200 may be illuminated by the second data and the third data. Thus, even though no additional lighting is installed inside the housing 200, the user may see the inside of the housing 200.

As illustrated in FIGS. 5 and 6, the plurality of support bars 105 may be interposed between the display 106 and the second frame 102. In addition, the plurality of support bars 105 may be interposed between the display 106 and the roller 104. That is, the plurality of support bars 105 may be provided behind the deformation area.

The plurality of support bars 105 may form long bar shapes parallel to the rotational axis of the roller 104. The plurality of support bars 105 may be spaced apart from each other by a constant distance. The plurality of support bars 105 may be attached to the back surface of the back plate 1062.

As described above, the back surface part 1022 may be positioned behind the front surface part 1021. The back surface part 1022 may form a plane parallel to the front surface part 1021. The front surface part 1021 may slide behind the front surface part 1011. Accordingly, a front surface of the front surface part 1011 may form a stepped portion with a front surface of the front surface part 1021.

The display 106 may be attached to the front surface of the front surface part 1011. Accordingly, the display 106 may be spaced apart from the front surface part 1021 by a distance that is the same as the stepped portion. Between the display 106 and the second frame 102, the plurality of the support bars 105 may form a height that is the same as the stepped portion. Accordingly, the plurality of the support bars 105 may maintain the flatness of the display panel 1061 in the first area A1.

If the plurality of support bars 105 are not present, a back surface of the display 106 may come into direct contact with the second frame 102 and the roller 104. Further, if the plurality of support bars 105 are not present, friction may occur between the back surface of the display 106 and the second frame 102 and between the back surface of the display 106 and the roller 104 when the state of the opening 211 is converted from the closed state to the first open state or vice versa.

Friction energy may easily be converted to heat energy. The display panel 1061 may easily be damaged by heat energy. The display 106 may be spaced apart from the second frame 102 and the roller 104 by the plurality of support bars 105. According, the plurality of support bars 105 may help to prevent damage to the display 106 caused by heat energy.

As described above, the plurality of support bars 105 may be attached to the display 106. Accordingly, friction may not occur between the plurality of support bars 105 and the back plate 1062.

Figure 11:
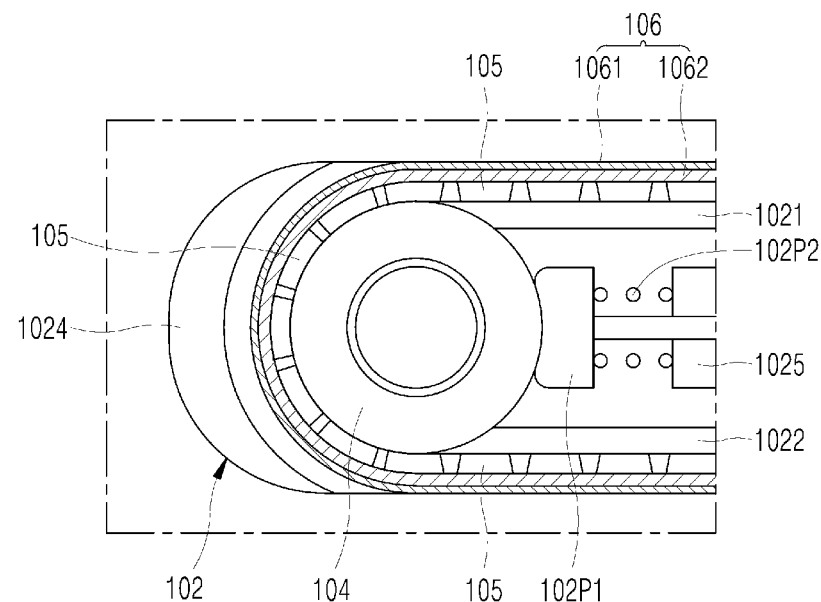
FIG. 11 is a view illustrating an example of a lower portion of the vehicle display device of FIG. 5.

FIG. 11 is a view illustrating an example of a lower portion of the vehicle display device 100 of FIG. 5.

As described above, the back plate 1062 may be attached to the front surface part 1011 of the first frame 101 and the back surface of the third frame 103. The attachment force between the first frame and the back plate 1062 and between the third frame 103 and the back plate 1062 may be reduced due to shock or heat energy. The flatness of the display 106 may be reduced as the attachment force between the first frame and the back plate 1062 and between the third frame 103 and the back plate 1062 decreases.

As illustrated in FIG. 11, the roller 104 may be pushed away from the first frame 101 by the push member 102P. The push member 102P may include a contact member 102P1 and a compression spring 102P2.

The contact member 102P1 may come into contact with the roller 104. The contact member 102P1 may form a curved surface coming into contact with the roller 104. The contact member 102P1 may be made of engineering plastic, which has strength and elasticity and heat resistance. In some examples, the contact member 102P1 may be a protrusion that contact the roller 104.

The compression spring 102P2 may be interposed between the contact member 102P1 and the second frame 102. In some examples, the second frame 102 may include a part 1025 spaced apart from the contact member 102P1. Between the contact member 102P1 and the second frame 102, the compression spring 102P2 may form a resilience that pushes the roller 104 away from the first frame 101.

Accordingly, even though the attachment force between the first frame 101 and the back plate 1062 and between the third frame 103 and the back plate 1062 decreases, the flatness of the display 106 may be maintained. As described above, the rotational shaft of the roller 104 may be inserted into the hole or groove of the side surface parts 1023. The hole or groove of the side surface parts 1023 may be formed to extend in a direction in which the resilience of the compression spring 102P2 is formed.

Figure 12:
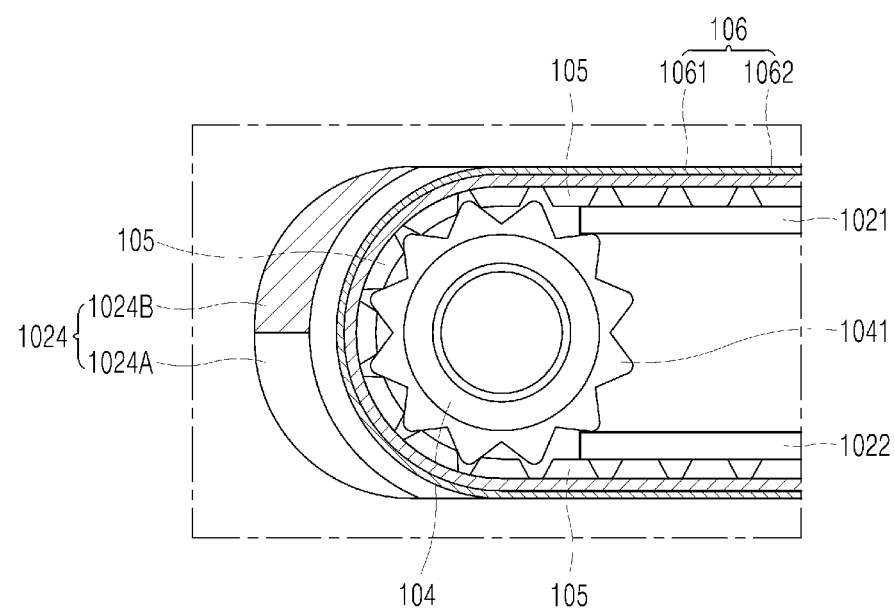
FIG. 12 is a view illustrating an example of the lower portion of the vehicle display device of FIG. 5.

FIG. 12 is a view illustrating an example of the lower portion of the vehicle display device 100 of FIG. 5.

As illustrated in FIG. 12, a plurality of projections 1041 may be formed on the outer surface of the roller 104, and the plurality of support bars 105 may be caught by the plurality of projections 1041. For example, when the state of the opening 211 is converted from the closed state to the first open state or vice versa, sliding between the plurality of support bars 105 and the roller 104 may be restricted by the coupling between the projections 1041 and the support bars 104. As described above, friction energy caused by sliding may be easily converted to heat energy. When the plurality of projections 1041 are formed on the outer surface of the roller 104, the temperature of the plurality of support bars 105 may be maintained to be relatively low.

Figure 13:
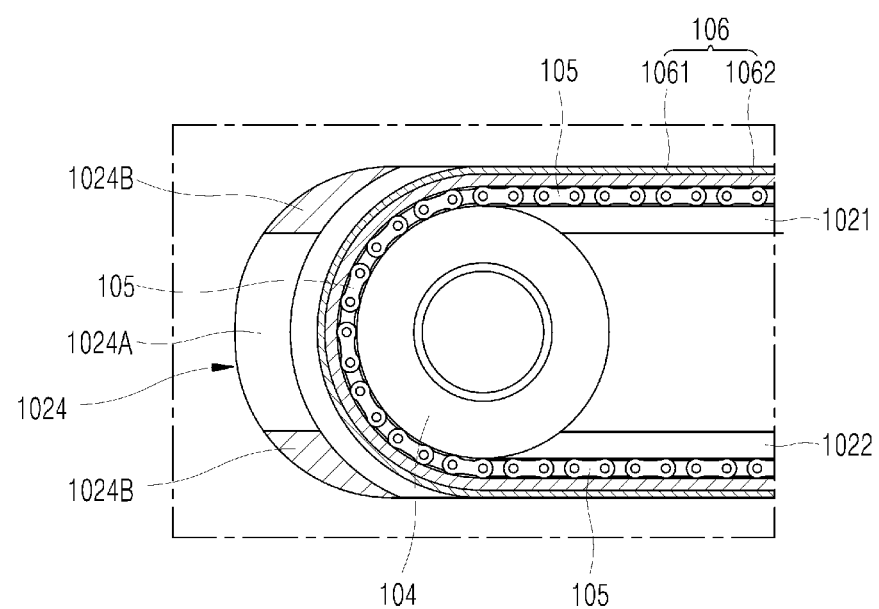
FIG. 13 is a view illustrating an example of the lower portion of the vehicle display device of FIG. 5.

FIG. 13 is a view illustrating an example of the lower portion of the vehicle display device 100 of FIG. 5.

As shown in FIG. 13, the plurality of support bars 105 may be connected to each other in the form of a chain. The plurality of support bars 105 connected to each other in the form of a chain may connect the first frame 101 and the third frame 103.

As described above, the display 106 may connect the front surface part of the first frame 101 and the third frame 103 while being wound around the roller 104. Accordingly, when the state of the opening 211 is converted from the closed state to the first open state or vice versa, a force may be repeatedly exerted on the display 106.

While the plurality of support bars 105 connected to each other in the form of a chain connect the first frame 101 and the third frame 103, when the state of the opening 211 is converted from the closed state to the first open state or vice versa, the force exerted on the display 106 may be dispersed to the plurality of support bars 105. Accordingly, damage to the display panel 1061 may be avoided.

As shown in FIGS. 12 and 13, the cover 1024 may include a transparent part 1024A and an opaque part 1024B. The transparent part 1024A may be a part through which the light outputted from the third area A3 passes. The opaque part 1024B may be a part through which the light outputted from the third area A3 does not pass. Accordingly, the range of light outputted from the third area A3 may be adjusted by combining the transparent part 1024A and the opaque part 1024B.

Figure 14:
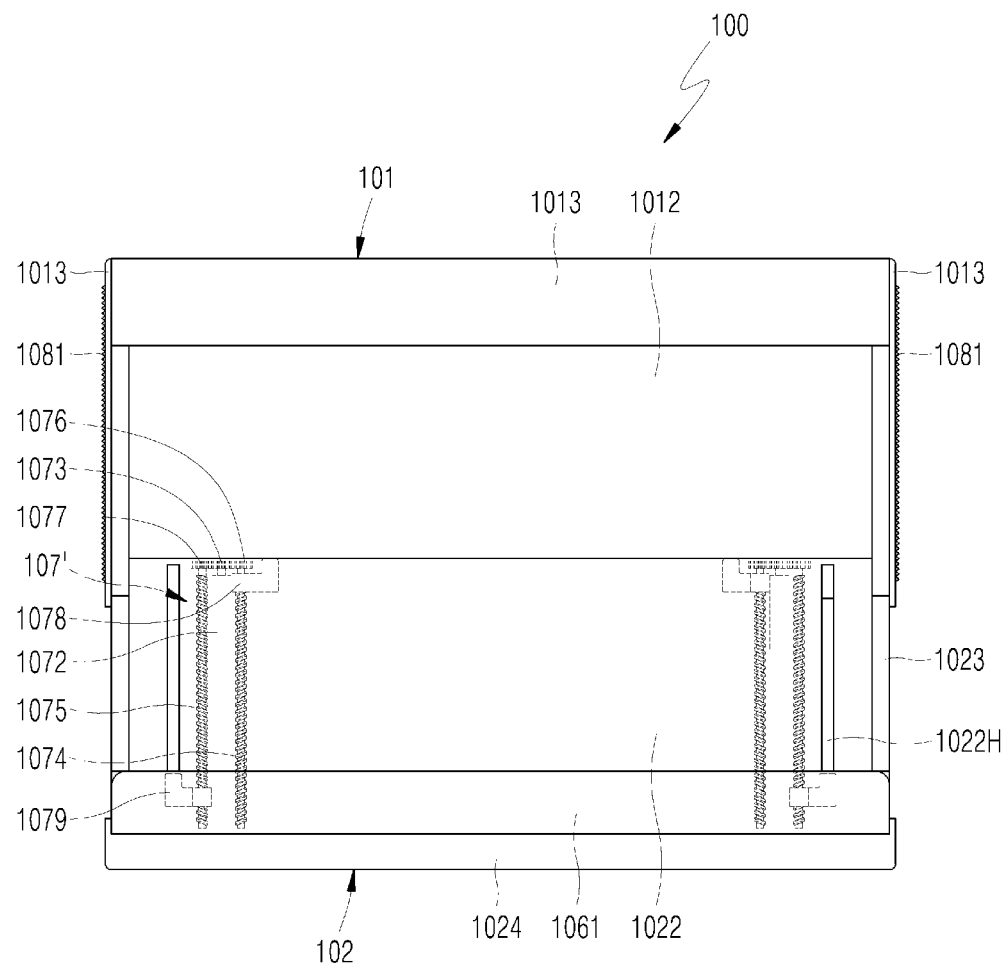
FIG. 14 is a rear view illustrating the vehicle display device and the opening of the vehicle storage of FIG. 2 in the closed state.
Figure 15:
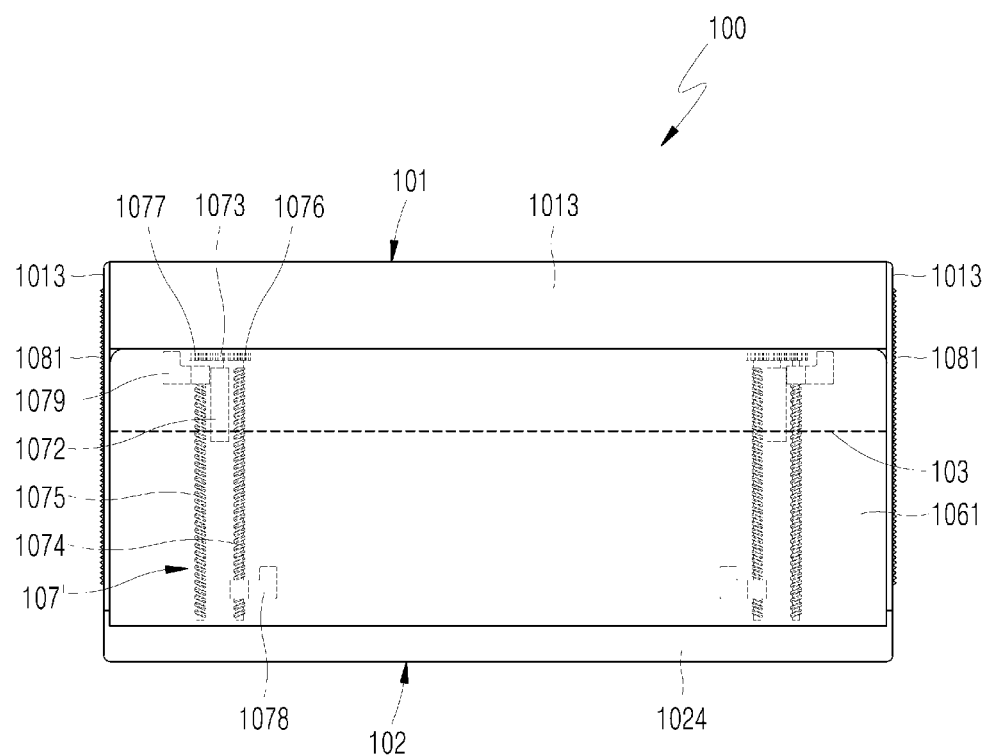
FIG. 15 is a rear view illustrating the vehicle display device and the opening of the vehicle storage of FIG. 3 in the first open state.

FIG. 14 is a rear view showing the vehicle display device 100 when the opening 211 of the vehicle storage 1 of FIG. 2 is in a closed state. FIG. 15 is a rear view showing the vehicle display device 100 and the opening 211 of the vehicle storage 1 of FIG. 3 in the first open state.

As illustrated in FIGS. 14 and 15, the first actuator 107 may be a component that moves the first frame 101 and the third frame 103 in opposite directions to each other with respect to the second frame 102.

Figure 16:
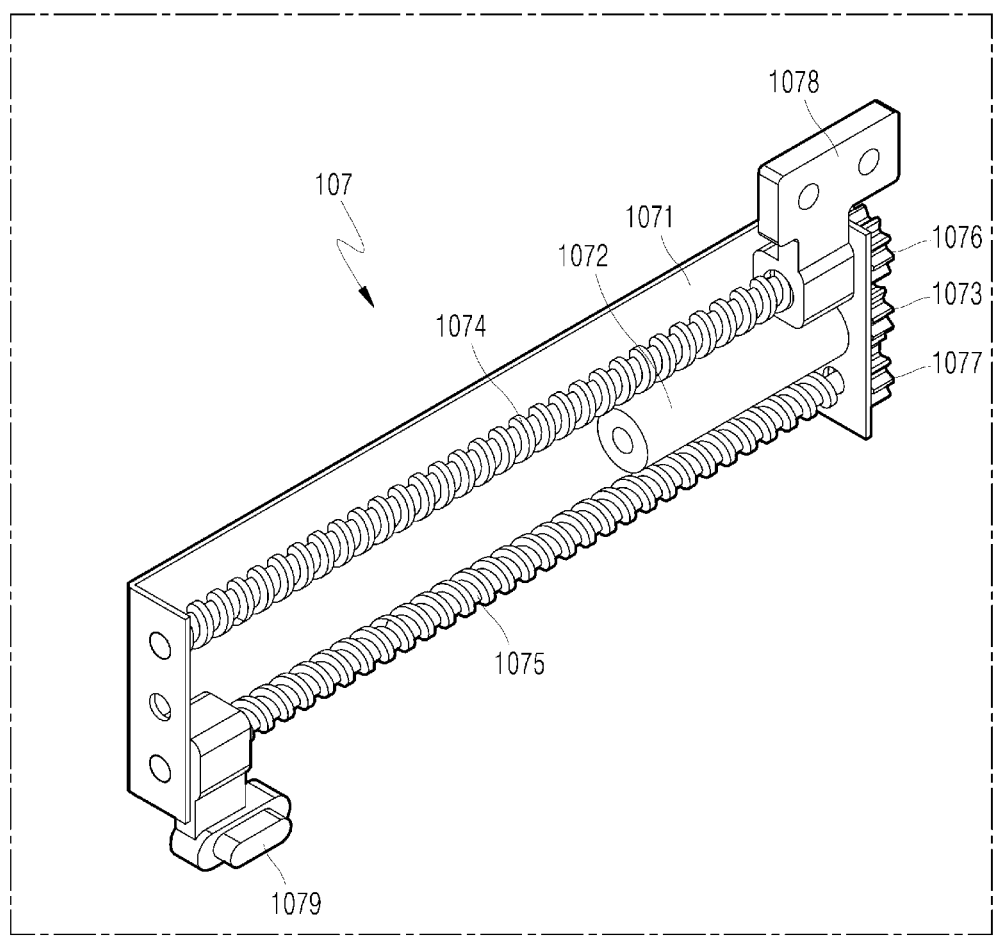
FIG. 16 is a view illustrating an example of a first actuator and the opening of the vehicle storage of FIG. 14 in the closed state.
Figure 17:
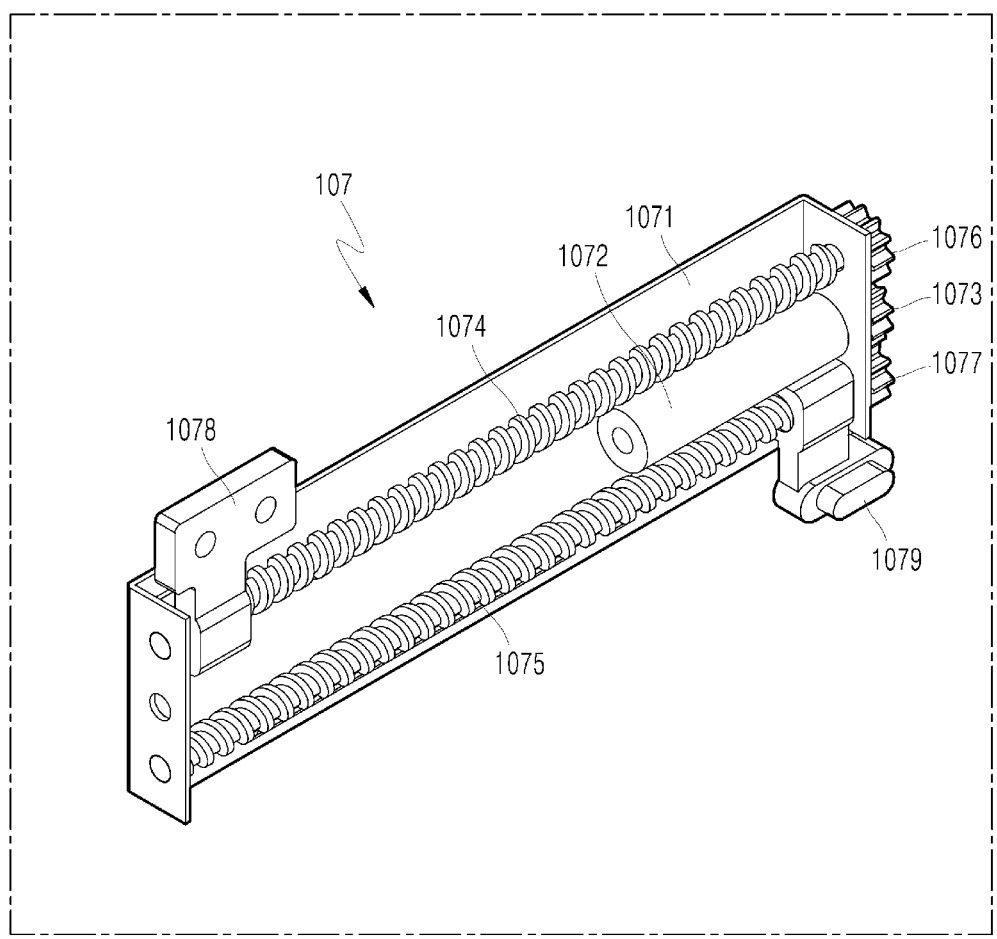
FIG. 17 is a view illustrating the first actuator and the opening of the vehicle storage of FIG. 15 in the first open state.

FIG. 16 is a view illustrating the first actuator 107 with the opening 211 of the vehicle storage 1 of FIG. 14 closed. FIG. 17 is a view illustrating the first actuator 107 with the opening 211 of the vehicle storage 1 of FIG. 15 in the first open state.

As illustrated in FIGS. 16 and 17, the first actuator 107 may include a bracket 1071, a motor 1072, a driving gear 1073, a first screw 1074, a second screw 1075, a first driven gear 1076, a second driven gear 1077, a first mounting part 1078, and a second mounting part 1079.

The bracket 1071 may be coupled to the second frame 102. The second frame 102 may have a bent form like a square bracket. The motor 1072 may be mounted to the bracket 1071. The motor 1072 may be provided as a step motor. The motor 1072 may be rotated under the control of the controller 180. The driving gear 1073 may be mounted to a rotation shaft of the motor 1072. The driving gear 1073 may be rotated by the motor 1072.

The first screw 1074 may be rotatably mounted in the bracket 1071. On the outer surface of the first screw 1074, screw threads may be formed. The axis direction of the first screw 1074 may align with the first movement direction. The second screw 1075 may be rotatably mounted in the bracket 1071. On the outer surface of the second screw 1075, screw threads may be formed.

The first driven gear 1076 may be coupled to the first screw 1074. The first driven gear 1076 may engage with the driving gear 1073. Rotatory motion of the driving gear 1073 may be transferred to the first driven gear 1076. Accordingly, the first driven gear 1076 may rotate the first screw 1074.

The second driven gear 1077 may be coupled to the second screw 1075. The second driven gear 1077 may engage with the driving gear 1073. Rotatory motion of the driving gear 1073 may be transferred to the second driven gear 1077. Accordingly, the second driven gear 1077 may rotate the second screw 1075.

The first mounting part 1078 may be rotatably screw-coupled to the first screw 1074. The first mounting part 1078 may be coupled to the first frame 101. The first mounting part 1078 may be coupled to the first frame 101 by one or more bolts.

The second frame 102 may be mounted to the first frame 101 so as to move in a sliding manner. Accordingly, when the first screw 1074 rotates, the first frame 101 may slide in the first movement direction with respect to the second frame 102.

The second mounting part 1079 may be rotatably screw-coupled to the second screw 1075. The second mounting part 1079 may pass through the slot hole 1022H to be coupled to the third frame 103. The second mounting part 1079 may be attached to the third frame 103.

The third frame 103 may be mounted to the back surface part 1022 of the second frame 102 so as to move in a sliding manner. Accordingly, when the second screw 1075 rotates, the third frame 103 may slide in the first movement direction with respect to the second frame 102.

As illustrated in FIGS. 16 and 17, the first screw 1074 and the second screw 1075 may have threads, and the threads of the first screw 1074 and the second screw 1075 may be formed in opposite directions to each other. If the first screw 1074 has left-handed threads, the second screw 1075 may have right-handed threads. If the first screw 1074 has right-handed threads, the second screw 1075 may have left-handed threads.

As illustrated in FIGS. 5 and 6, the display 106 may be wound around the roller 104 such that the direction of the display 106 changes by 180 degrees. The display 106 may connect the front surface part 1011 of the first frame 101 and the third frame 103 while being wound around the roller 104.

Accordingly, in order to keep the display 106 wound around the roller 104, the first frame 101 and the third frame 103 should move in opposite directions to each other with respect to the second frame 102. In other words, in order to keep the display 106 wound around the roller 104, the third frame 103 should move twice as much as a movement distance of the second frame with respect to the first frame 101, in the same direction as that of the second frame 102.

As illustrated in FIGS. 14 and 15, when the driving gear 1073 rotates, the first mounting part 1078 and the second mounting part 1079 may move in opposite directions to each other. That is, when the motor 1072 rotates, the first frame 101 and the third frame 103 move in opposite directions to each other with respect to the second frame 102.

In other words, when the motor 1072 rotates, the third frame 103 may move twice as much as a movement distance of the second frame with respect to the first frame 101, in the same direction as that of the second frame 102. Accordingly, the first actuator 107 may keep the display 106 wound around the roller 104 while opening or closing the opening 211.

As illustrated in FIGS. 5 and 6, a pair of hall sensors 101S may be provided in the first frame 101. Also, the second frame 102 may be provided with a magnetic member 102M. The magnetic member 102M may be a permanent magnet.

The hall sensors 101S may be sensors for detecting a magnetic property. The hall sensors 101S may start detecting the magnetic property of the magnetic member 102M right before the opening 211 is completely closed. The hall sensors 101S may start detecting the magnetic property of the magnetic member 102M right before the opening 211 is completely in the first open state.

Signals of the hall sensors 101S may be transmitted to the controller 180. When the hall sensors 101S detect the magnetic member 102M, the controller 180 may change the rotation speed of the motor 1072. The controller 180 may reduce the rotation speed of the motor 1072 by the signals of the hall sensors 101S right before the opening 211 is completely closed and completely in the first open state.

Figure 18:
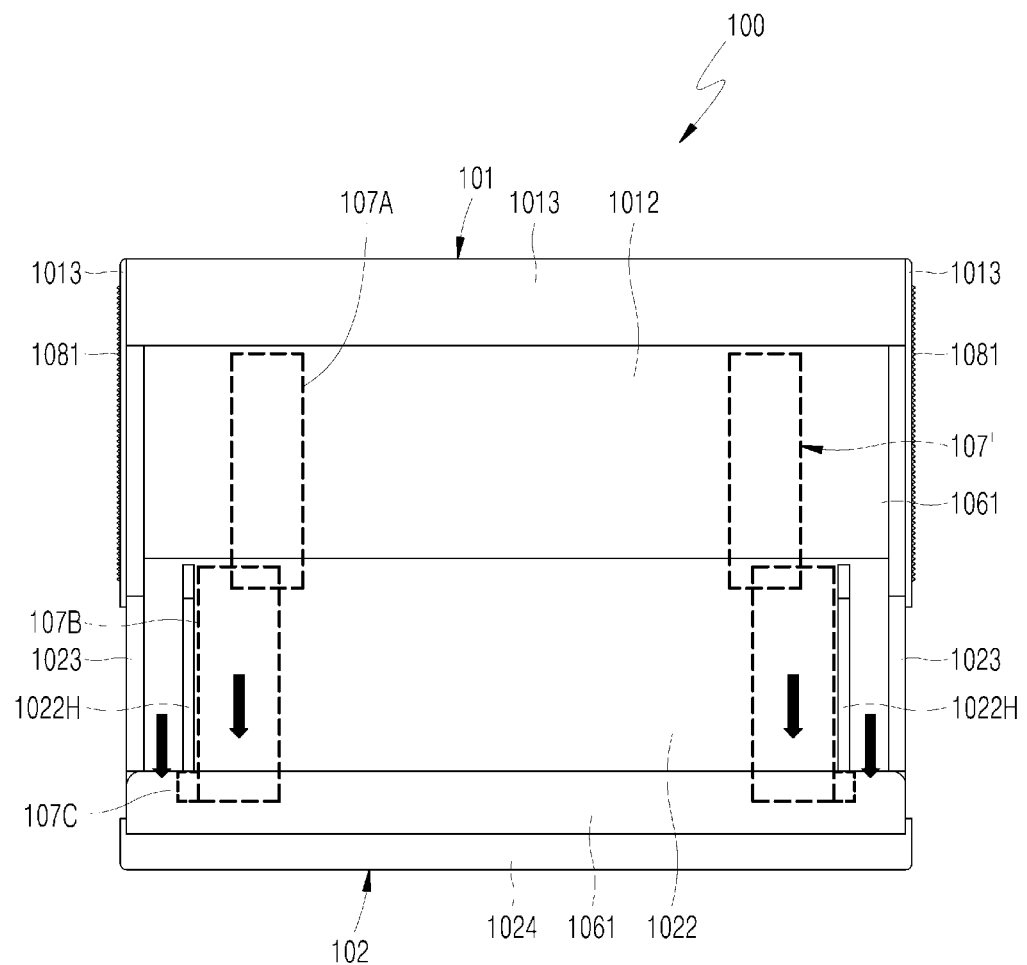
FIG. 18 is a rear view illustrating the vehicle display device and the opening of the vehicle storage of FIG. 2 in the closed state.
Figure 19:
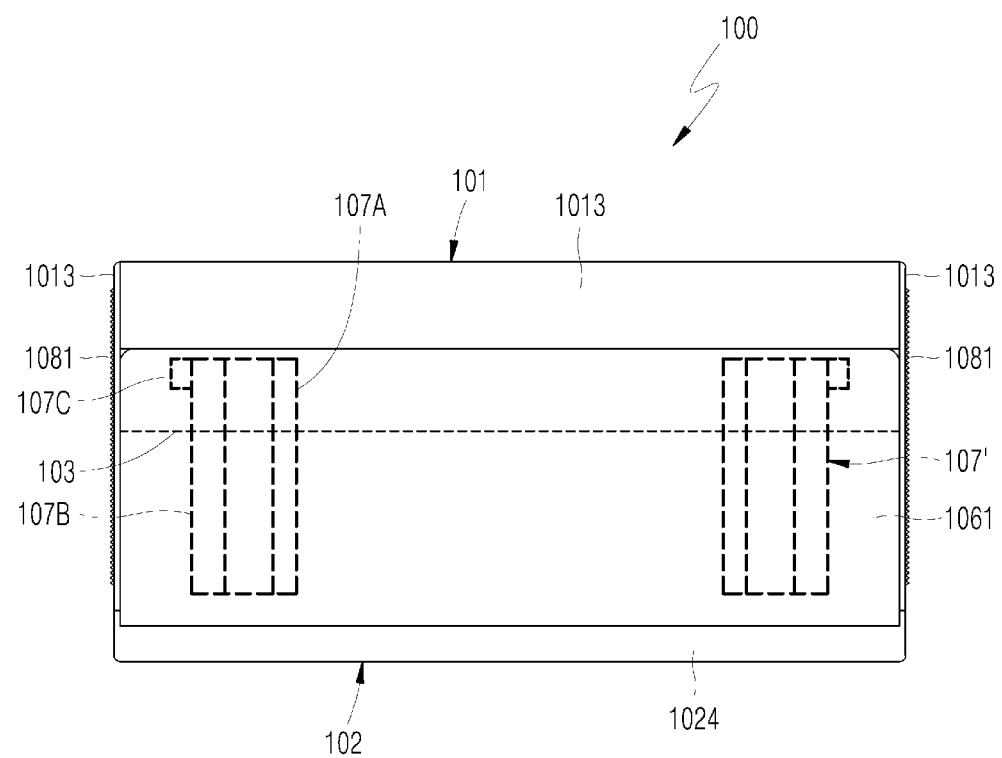
FIG. 19 is a rear view illustrating the vehicle display device and the opening of the vehicle storage of FIG. 3 in the first open state.

FIG. 18 is a rear view showing the vehicle display device 100 and the opening 211 of the vehicle storage 1 of FIG. 2 in a closed state. FIG. 19 is a rear view showing the vehicle display device 100 and the opening 211 of the vehicle storage 1 of FIG. 3 in the first open state.

Figure 20:
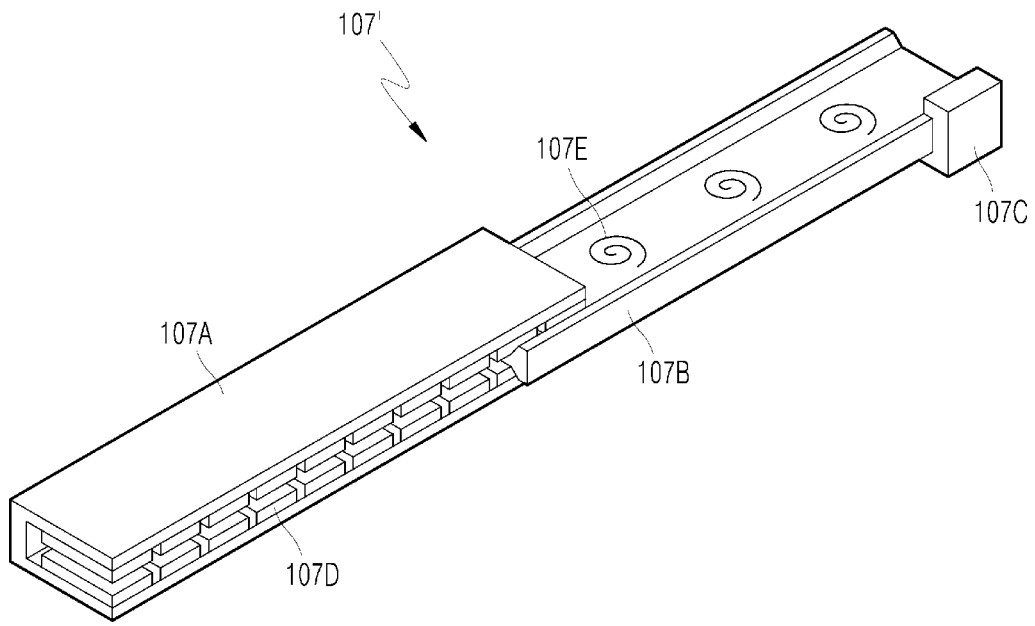
FIG. 20 is a view illustrating the first actuator and the opening of the vehicle storage of FIG. 18 in the closed state.
Figure 21:
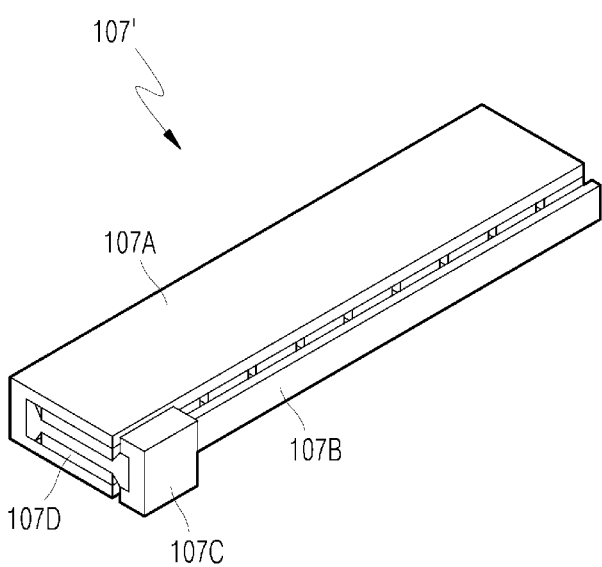
FIG. 21 is a view illustrating the first actuator and the opening of the vehicle storage of FIG. 19 in the first open state.

FIG. 20 is a view illustrating the first actuator 107 with the opening 211 of the vehicle storage 1 of FIG. 18 closed. FIG. 21 is a view illustrating the first actuator 107 with the opening 211 of the vehicle storage 1 of FIG. 19 in the first open state.

As illustrated in FIGS. 18 to 21, the first actuator 107 may include a first bracket 107A, a second bracket 107B, a third bracket 107C, a magnet 107D, and a coil 107E.

The first bracket 107A may be coupled to the first frame 101. The first bracket 107A may be coupled to the first frame 101 by one or more bolts.

The second bracket 107B may be coupled to the second frame 102. The second bracket 107B may be mounted to the first bracket 107A so as to slide in the first movement direction.

The third bracket 107C may pass through the slot hole 1022H to be coupled to the third frame 103. The third bracket 107C may be attached to the third frame 103. The third bracket 107C may be mounted to the second bracket 107B so as to slide in the first movement direction.

The first bracket 107A may be provided with the magnet 107D. The magnet 107D may be a permanent magnet. The second bracket 107b may be provided with the coil 107E. When a current flows through the coil 107E, a linear force may be generated within a magnetic field of the magnet 107D provided in the first bracket 107A, and the second bracket 107B may move in the first movement direction.

The third bracket 107C may also be provided with a coil 107E. When a current flows through the coil 107E, a linear force may be generated within the magnetic field of the magnet 107D provided in the first bracket 107A, and the third bracket 107C may move in the first movement direction.

When a current is alternately applied to the coils 107E of the second bracket 107B and the third bracket 107C, the second bracket 107B and the third bracket 107C may alternately move by a certain distance.

Figure 22:
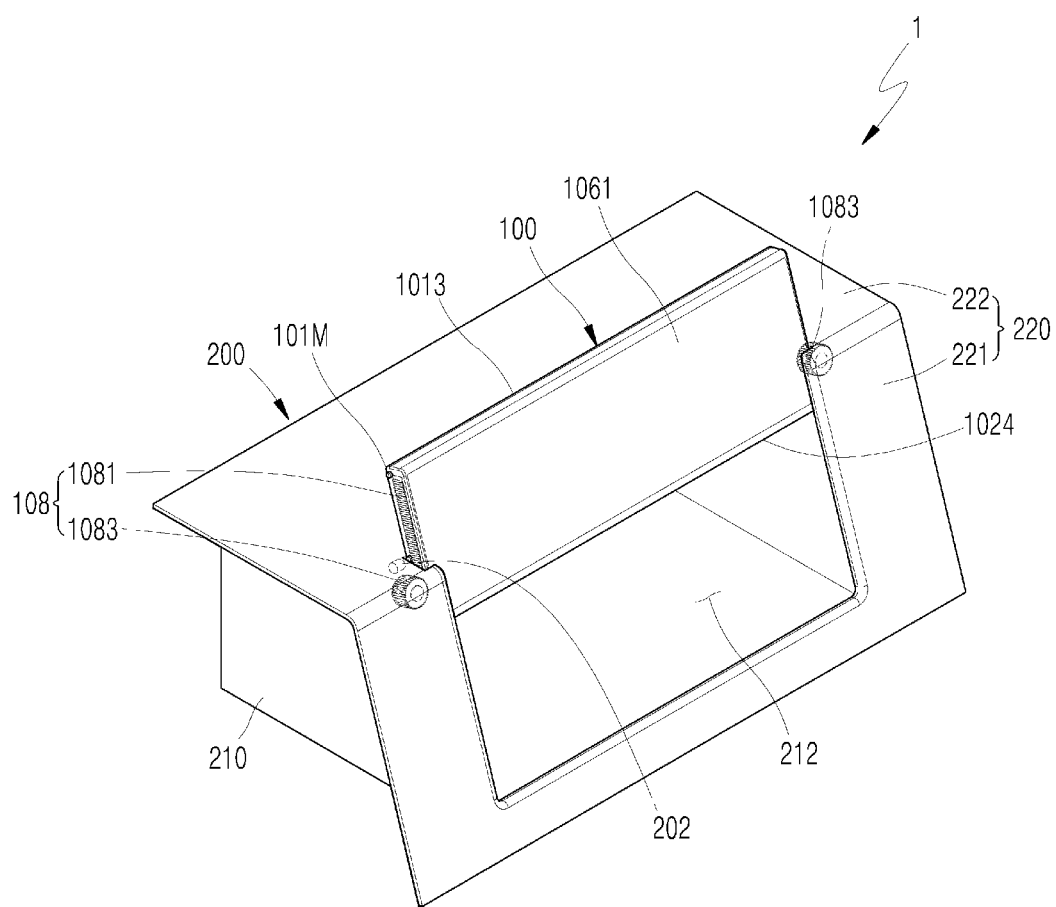
FIG. 22 is a perspective view illustrating the vehicle storage of FIG. 2 and the opening in a second open state.
Figure 23:
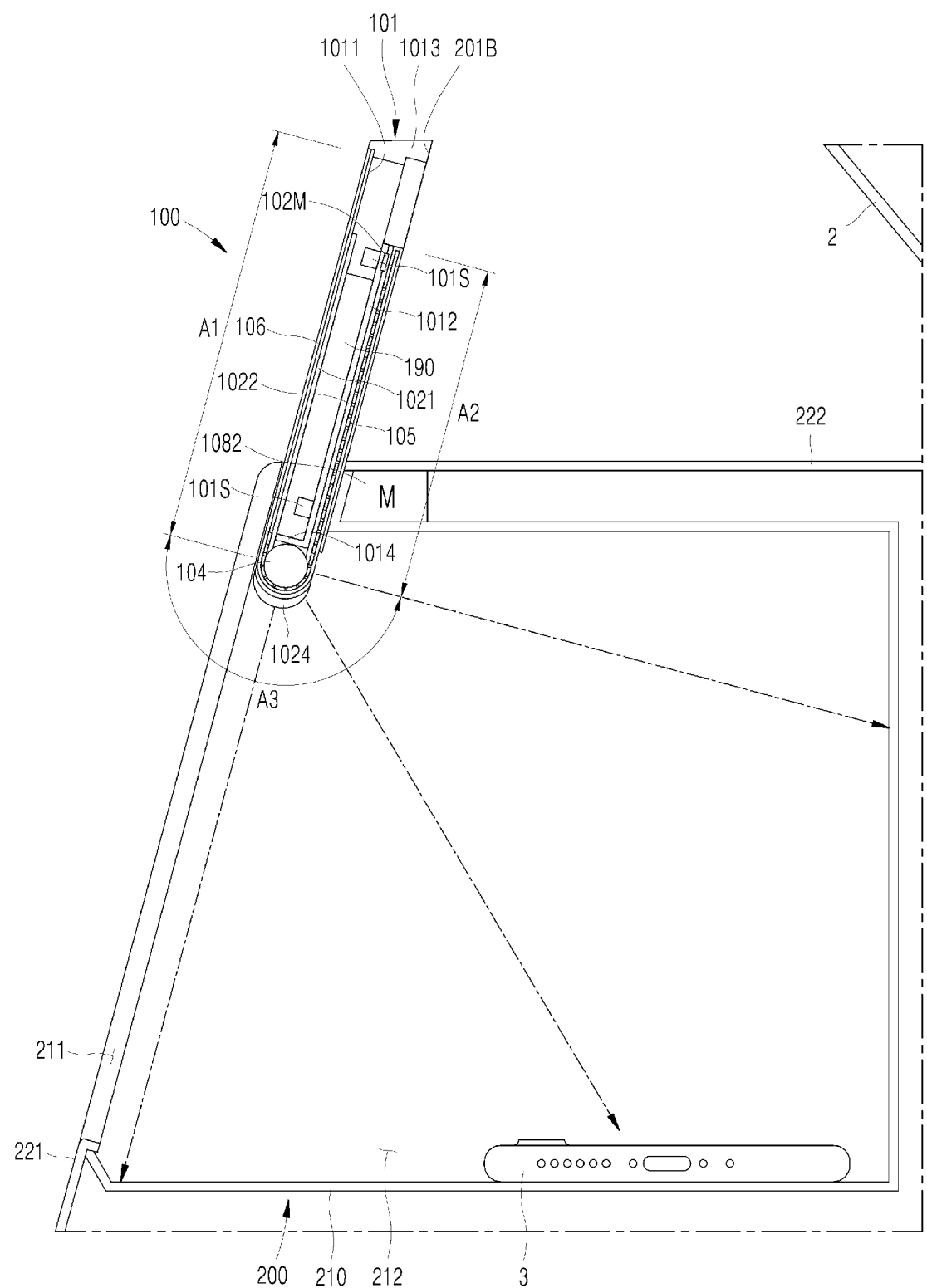
FIG. 23 is a cross-sectional view illustrating the vehicle storage of FIG. 22 and the opening in the second open state, where the third area of the display illuminates the inside of the housing.

FIG. 22 is a perspective view showing the vehicle storage 1 of FIG. 2 and the opening 211 in a second open state. FIG. 23 is a cross-sectional view showing the vehicle storage 1 of FIG. 22 and the opening 211 in the second open state, where the third area A3 of the display 106 illuminates the inside of the housing 200. In some examples, the vehicle display device 100 may extend toward the windshield 2 of the vehicle.

As illustrated in FIGS. 22 and 23, the first frame 101 may be mounted in the housing 200 so as to move in a sliding manner. The second actuator 108 may slide the first frame 101. The second actuator 108 may include a rack 1081 and a pinion 1083.

As illustrated in FIG. 22, the rack 1081 may be formed on each of the side surface parts 1013 of the first frame 101. The rack 1081 may be formed to extend and align with the second movement direction.

The pinion 1083 may be provided in the housing 200. The pinion 1083 may be rotated by the motor 1082. The pinion 1083 may engage with the rack 1081. When the motor 1082 rotates the pinion 1083, the first frame 101 may slide in the second movement direction. Accordingly, the opening 211 may be opened and closed as much as a movement distance of the first frame 101 with respect to the housing 200.

As illustrated in FIG. 23, with the opening 211 in the second open state, the second area A2, apart from a portion of the second area A2 that is very close to the third area A3, may be positioned higher than the body 210. Accordingly, with the opening 211 in the second open state, the third area A3 may visually output the third data to the inside of the housing 200.

With the opening 211 in the second open state, the controller 180 may output the third data to the third area A3. Accordingly, with the opening 211 in the second open state, the inside of the housing 200 may be illuminated by the third data. Thus, even though no additional lighting is installed in the housing 200, the user may see the inside of the housing 200.

As illustrated in FIG. 22, a hall sensor 202 may be provided in the housing 200. Also, the first frame 101 may be provided with a pair of magnetic members 101M having a magnetic property. The magnetic members 101M may be a permanent magnet.

The hall sensor 202 may be a sensor for detecting a magnetic property. The hall sensor 202 may start detecting the magnetic property of the magnetic members 101M right before the opening 211 is completely in the first open state. The hall sensor 202 may start detecting the magnetic property of the magnetic member 101M right before the opening 211 is completely in the second open state.

A signal of the hall sensor 202 may be transmitted to the controller 180. When the hall sensor 202 detects the magnetic members 101M, the controller 180 may change the rotation speed of the motor 1082. The controller 180 may reduce the rotation speed of the motor 1082 by the signal of the hall sensor 202 right before the opening 211 is completely in the first open state and completely in the second open state.

While the foregoing has been given by way of illustrative example of the present disclosure, all such and other modifications and variations thereto as would be apparent to those skilled in the art are deemed to fall within the broad scope and ambit of this disclosure as is herein set forth. Accordingly, such modifications or variations are not to be regarded as a departure from the spirit or scope of the present disclosure, and it is intended that the present disclosure cover the modifications and variations of this invention provided they come within the scope of the appended claims and their equivalents.

What is claimed is:

1. A vehicle display device configured to be mounted at a housing within a vehicle and to open and close an opening defined at the housing, the vehicle display device comprising:
   a first frame configured to be disposed at the opening;
   a second frame disposed at the first frame and configured to move relative to the first frame;
   a roller rotatably disposed at the second frame;
   a third frame disposed at a back surface of the second frame and configured to move relative to the second frame; and
   a display disposed at a front surface of the first frame and wound around the roller to connect to the third frame, wherein the vehicle display device is configured to open and close at least a portion of the opening, a size of the opened portion corresponding to a movement distance of the second frame with respect to the first frame, wherein the display comprises:
- a first area that is configured to output first data and faces a forward direction of the first frame and the second frame,
- a second area that is configured to output second data and faces a backward direction of the second frame and the third frame, and
- a third area that connects the first area to the second area and is configured to output third data in a radial direction of the roller, wherein the vehicle display device is configured to decrease a size of the first area based on increasing the size of the opened portion, and wherein the display comprises:
- a display panel having a first surface configured to output data, and
- a back plate that is attached to a second surface of the display panel opposite to the first surface, the back plate supporting the third area of the display.

2. The vehicle display device of claim 1, wherein the second area and the third area of the display are configured to output the second data and the third data, respectively, to an inside of the housing in a state in which at least the portion of the opening is opened.

3. The vehicle display device of claim 1, wherein the back plate defines a plurality of through holes that extend in parallel to an axial direction of the roller.

4. The vehicle display device of claim 1, further comprising a first actuator configured to move the first frame and the third frame in opposite directions to each other with respect to the second frame.

5. The vehicle display device of claim 4, wherein the first actuator comprises:
- a bracket coupled to the second frame;
- a first motor disposed at the bracket;
- a driving gear configured to be rotated by the first motor;
- a first screw rotatably disposed at the bracket;
- a second screw that is rotatably disposed at the bracket and extends in parallel to the first screw;
- a first driven gear engaged with the driving gear and configured to rotate the first screw;
- a second driven gear engaged with the driving gear and configured to rotate the second screw;
- a first mounting part coupled to the first frame and to the first screw; and
- a second mounting part coupled to the third frame and to the second screw, and wherein the first actuator is configured to, based on rotation of the driving gear, move the first mounting part and the second mounting part in opposite directions to each other.

6. The vehicle display device of claim 5, further comprising:
- a magnetic member disposed at the second frame; and
- a hall sensor disposed at the first frame and configured to detect the magnet member to allow the first motor to change a rotation speed.

7. The vehicle display device of claim 4, wherein the first frame is configured to be mounted at the housing and to move relative to the housing, and wherein the size of the opened portion corresponds to a movement distance of the first frame with respect to the housing.

8. The vehicle display device of claim 7, wherein the first frame is configured to be guided by a rail defined at the housing, and wherein the vehicle display device further comprises a second actuator configured to move the first frame along the rail.

9. The vehicle display device of claim 8, wherein the second actuator comprises:
- a rack that is defined at the first frame and extends in parallel to the rail; and
- a pinion configured to engage with the rack and to be rotated by a motor.

10. The vehicle display device of claim 9, further comprising a magnet disposed at the first frame and configured to be detected by a hall sensor disposed at the housing, the hall sensor being configured to detect the magnet to allow the motor to change a rotation speed.

11. The vehicle display device of claim 1, further comprising a plurality of support bars that are disposed between the display and the second frame and between the display and the roller.

12. The vehicle display device of claim 11, wherein the plurality of support bars are attached to the display.

13. The vehicle display device of claim 11, wherein the roller comprises a plurality of projections disposed at an outer surface of the roller and configured to catch the plurality of support bars.

14. The vehicle display device of claim 1, further comprising a chain that connects the first frame to the third frame and is disposed between the display and the second frame and between the display and the roller.

15. The vehicle display device of claim 1, further comprising a push member disposed at the second frame and configured to push the roller in a direction away from the first frame.

16. The vehicle display device of claim 15, wherein the push member comprises:
- a contact member configured to come into contact with the roller; and
- a spring disposed between the contact member and the second frame.

17. A vehicle storage comprising:
- a housing that is disposed within a vehicle and defines an opening; and
- a vehicle display device disposed at the opening, the vehicle display device being configured to extend to cover the opening and to shrink to open at least a portion of the opening, the vehicle display device comprising:
  - a first frame configured to be disposed at the opening,
  - a second frame disposed at the first frame and configured to move relative to the first frame,
  - a roller rotatably disposed at the second frame,
  - a third frame disposed at a back surface of the second frame and configured to move relative to the second frame, and
  - a display disposed at a front surface of the first frame and wound around the roller to connect to the third frame, wherein the vehicle display device is configured to open and close at least a portion of the opening, a size of the opened portion corresponding to a movement distance of the second frame with respect to the first frame, wherein the display comprises:
- a first area that is configured to output first data and faces a forward direction of the first frame and the second frame, a second area that is configured to output second data and faces a backward direction of the second frame and the third frame, and a third area that connects the first area to the second area and is configured to output third data in a radial direction of the roller, wherein the vehicle display device is configured to decrease a size of the first area based on increasing the size of the opened portion, and wherein the display comprises:

a display panel having a first surface configured to output data, and a back plate that is attached to a second surface of the display panel opposite to the first surface, the back plate supporting the third area of the display.

18. A vehicle display device configured to be mounted at a housing within a vehicle and to open and close an opening defined at the housing, the vehicle display device comprising:

a first frame configured to be disposed at the opening;

a second frame disposed at the first frame and configured to move relative to the first frame;

a roller rotatably disposed at the second frame;

a third frame disposed at a back surface of the second frame and configured to move relative to the second frame;

a display disposed at a front surface of the first frame and wound around the roller to connect to the third frame; and a first actuator configured to move the first frame and the third frame in opposite directions to each other with respect to the second frame, wherein the vehicle display device is configured to open and close at least a portion of the opening, a size of the opened portion corresponding to a movement distance of the second frame with respect to the first frame.

19. The vehicle display device of claim 18, wherein the first actuator comprises:

a bracket coupled to the second frame;

a first motor disposed at the bracket;

a driving gear configured to be rotated by the first motor;

a first screw rotatably disposed at the bracket;

a second screw that is rotatably disposed at the bracket and extends in parallel to the first screw;

a first driven gear engaged with the driving gear and configured to rotate the first screw;

a second driven gear engaged with the driving gear and configured to rotate the second screw;

a first mounting part coupled to the first frame and to the first screw; and a second mounting part coupled to the third frame and to the second screw, and wherein the first actuator is configured to, based on rotation of the driving gear, move the first mounting part and the second mounting part in opposite directions to each other.

20. The vehicle display device of claim 18, wherein the first frame is configured to be mounted at the housing and to move relative to the housing, and wherein the size of the opened portion corresponds to a movement distance of the first frame with respect to the housing.

* * * * *